United States Patent
Lim et al.

(10) Patent No.: US 9,323,550 B2
(45) Date of Patent: *Apr. 26, 2016

(54) MECHANISM FOR PROVIDING VIRTUAL MACHINES FOR USE BY MULTIPLE USERS

(71) Applicant: VMware, Inc., Palo Alto, CA (US)

(72) Inventors: Beng-Hong Lim, Atherton, CA (US); Edouard Bugnion, Mountain View, CA (US); Scott W. Devine, Katonah, NY (US)

(73) Assignee: VMware, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/155,160

(22) Filed: Jan. 14, 2014

(65) Prior Publication Data

US 2014/0310708 A1    Oct. 16, 2014

Related U.S. Application Data

(63) Continuation of application No. 12/508,506, filed on Jul. 23, 2009, now Pat. No. 8,631,066, and a continuation of application No. 10/921,417, filed on Aug. 16, 2004, now abandoned, and a continuation of (Continued)

(51) Int. Cl.
*G06F 9/455* (2006.01)
*G06F 9/50* (2006.01)

(52) U.S. Cl.
CPC ........ *G06F 9/45504* (2013.01); *G06F 9/45558* (2013.01); *G06F 9/5077* (2013.01); *G06F 2009/45562* (2013.01); *G06F 2009/45575* (2013.01)

(58) Field of Classification Search
CPC ............ G06F 2009/45562; G06F 2009/45575; G06F 9/45558; G06F 2201/815
See application file for complete search history.

(56) References Cited

U.S. PATENT DOCUMENTS

| 4,703,481 A | 10/1987 | Fremont |
| 4,794,522 A | 12/1988 | Simpson |

(Continued)

FOREIGN PATENT DOCUMENTS

| EP | 0337463 A2 | 10/1989 |
| EP | 0534597 A2 | 3/1993 |
| EP | 0645701 A2 | 3/1995 |
| EP | 0709767 A2 | 5/1996 |

(Continued)

OTHER PUBLICATIONS

Silva et al., "Portable Checkpoiting and Recover," 1995, IEEE, pp. 188-195.

(Continued)

*Primary Examiner* — Backhean Tiv

(57) ABSTRACT

According to one aspect of the invention, a request to generate a state checkpoint of a computer is initiated within a user-level software entity, such as a virtual machine. Upon sensing the request, a checkpointing mechanism generates and stores at least one checkpoint, each checkpoint comprising a representation of the total state of the computer system. Upon sensing a state restoration request corresponding to one of the checkpoints, the checkpointing mechanism restores the checkpointed state in the computer, which can then resume operation from the restored total state. According to another aspect of the invention, a total checkpointed state is exported to another computer, where the state can be modified, for example, debugged, and then loaded into either the originally checkpointed computer (which, again, may be a virtual machine), or some other computer.

20 Claims, 5 Drawing Sheets

Related U.S. Application Data application No. 09/497,978, filed on Feb. 4, 2000, now Pat. No. 6,795,966, and a continuation of application No. 09/151,175, filed on Sep. 10, 1998, now Pat. No. 6,496,847.

(60) Provisional application No. 60/118,862, filed on Feb. 5, 1999.

(56) References Cited

U.S. PATENT DOCUMENTS

| | | |
|---|---|---|
| 4,812,967 A | 3/1989 | Hirosawa et al. |
| 4,814,971 A | 3/1989 | Thatte |
| 4,814,975 A | 3/1989 | Hirosawa et al. |
| 4,926,322 A | 5/1990 | Stimac |
| 4,970,639 A | 11/1990 | Diefendorf et al. |
| 4,974,159 A | 11/1990 | Barrett |
| 5,008,786 A | 4/1991 | Thatte |
| 5,023,771 A | 6/1991 | Kishi |
| 5,063,499 A | 11/1991 | Garber |
| 5,067,072 A | 11/1991 | Talati et al. |
| 5,077,657 A | 12/1991 | Cooper et al. |
| 5,088,031 A | 2/1992 | Takasaki et al. |
| 5,095,526 A | 3/1992 | Baum |
| 5,134,580 A | 7/1992 | Bertram |
| 5,167,023 A | 11/1992 | De Nicolas |
| 5,222,224 A | 6/1993 | Flynn |
| 5,255,379 A | 10/1993 | Melo |
| 5,291,605 A | 3/1994 | Takagi et al. |
| 5,301,287 A | 4/1994 | Herrell et al. |
| 5,307,504 A | 4/1994 | Robinson |
| 5,319,760 A | 6/1994 | Mason |
| 5,369,757 A * | 11/1994 | Spiro ............... G06F 11/1471 714/19 |
| 5,371,879 A | 12/1994 | Schiffleger |
| 5,386,552 A | 1/1995 | Garney et al. |
| 5,392,409 A | 2/1995 | Umeno et al. |
| 5,410,685 A | 4/1995 | Banda et al. |
| 5,432,795 A | 7/1995 | Robinson |
| 5,437,033 A | 7/1995 | Inoue et al. |
| 5,438,673 A | 8/1995 | Court et al. |
| 5,440,710 A | 8/1995 | Richter |
| 5,452,462 A | 9/1995 | Matsuura et al. |
| 5,488,716 A * | 1/1996 | Schneider ........... G06F 11/1691 714/10 |
| 5,511,217 A * | 4/1996 | Nakajima ........... G06F 9/45533 712/2 |
| 5,522,075 A | 5/1996 | Robinson |
| 5,553,291 A * | 9/1996 | Tanaka .................. G06F 9/526 718/1 |
| 5,560,013 A | 9/1996 | Scalzi et al. |
| 5,619,665 A | 4/1997 | Emma |
| 5,634,096 A | 5/1997 | Baylor et al. |
| 5,636,366 A | 6/1997 | Robinson |
| 5,652,869 A | 7/1997 | Herdeg |
| 5,652,872 A | 7/1997 | Richter |
| 5,692,193 A * | 11/1997 | Jagannathan ........... G06F 8/451 711/6 |
| 5,715,464 A | 2/1998 | Crump et al. |
| 5,721,922 A | 2/1998 | Dingwall |
| 5,748,882 A | 5/1998 | Huang |
| 5,758,174 A | 5/1998 | Crump et al. |
| 5,761,477 A | 6/1998 | Wahbe et al. |
| 5,768,593 A | 6/1998 | Walters et al. |
| 5,778,211 A | 7/1998 | Hohensee et al. |
| 5,781,750 A | 7/1998 | Blomgren et al. |
| 5,832,205 A | 11/1998 | Kelly |
| 5,835,743 A | 11/1998 | Zucker |
| 5,842,017 A | 11/1998 | Hookway et al. |
| 5,852,713 A | 12/1998 | Shannon |
| 5,893,144 A | 4/1999 | Wood |
| 5,896,522 A | 4/1999 | Ward et al. |
| 5,905,855 A | 5/1999 | Klaiber et al. |
| 5,918,048 A | 6/1999 | Mealey et al. |
| 5,966,706 A * | 10/1999 | Biliris ............... G06F 17/30368 |
| 6,009,261 A | 12/1999 | Scalzi et al. |
| 6,021,469 A | 2/2000 | Tremblay et al. |
| 6,075,937 A | 6/2000 | Scalzi et al. |
| 6,075,938 A | 6/2000 | Bugnion et al. |
| 6,142,682 A | 11/2000 | Skogby |
| 6,154,877 A | 11/2000 | Ramkumar et al. |
| 6,279,121 B1 | 8/2001 | Gamo |
| 6,289,396 B1 | 9/2001 | Keller |
| 6,298,434 B1 | 10/2001 | Lindwer |
| 6,308,318 B2 | 10/2001 | Krishnaswamy |
| 6,314,560 B1 | 11/2001 | Dunn et al. |
| 6,385,718 B1 | 5/2002 | Crawford et al. |
| 6,397,242 B1 | 5/2002 | Devine |
| 6,397,379 B1 * | 5/2002 | Yates, Jr. ............. G06F 9/45554 717/140 |
| 6,412,035 B1 | 6/2002 | Webber |
| 6,421,739 B1 * | 7/2002 | Holiday ............. G06F 11/1474 707/999.001 |
| 6,442,605 B1 | 8/2002 | Rodriguez |
| 6,496,847 B1 * | 12/2002 | Bugnion ............. G06F 9/45533 703/21 |
| 6,502,133 B1 | 12/2002 | Baulier |
| 6,513,156 B2 | 1/2003 | Bak et al. |
| 6,549,959 B1 * | 4/2003 | Yates .................. G06F 9/45554 710/1 |
| 6,631,514 B1 | 10/2003 | Le |
| 6,681,238 B1 | 1/2004 | Brice et al. |
| 6,704,925 B1 | 3/2004 | Bugnion |
| 6,742,123 B1 * | 5/2004 | Foote .................... G06F 9/4843 380/287 |
| 6,763,452 B1 * | 7/2004 | Hohensee ........... G06F 9/45554 703/22 |
| 6,779,107 B1 * | 8/2004 | Yates .................. G06F 9/45554 712/229 |
| 6,785,886 B1 | 8/2004 | Lim et al. |
| 6,795,966 B1 * | 9/2004 | Lim ..................... G06F 11/1438 718/1 |
| 6,941,545 B1 * | 9/2005 | Reese ................. G06F 9/45554 711/206 |
| 6,944,699 B1 * | 9/2005 | Bugnion ............. G06F 9/45533 710/269 |
| 7,093,086 B1 | 8/2006 | van Rietschote et al. |
| 7,103,625 B1 | 9/2006 | Hipp et al. |
| 7,203,944 B1 | 4/2007 | van Rietschote et al. |
| 7,213,246 B1 | 5/2007 | van Rietschote et al. |
| 7,246,200 B1 | 7/2007 | van Rietschote et al. |
| 7,313,793 B2 | 12/2007 | Traut et al. |
| 7,370,164 B1 | 5/2008 | Nagarkar et al. |
| 7,516,453 B1 | 4/2009 | Bugnion |
| 7,603,670 B1 | 10/2009 | van Rietschote et al. |
| 7,665,088 B1 | 2/2010 | Bugnion |
| 7,761,857 B1 | 7/2010 | Bedichek et al. |
| 7,793,286 B2 | 9/2010 | Bennett et al. |
| 7,831,820 B2 | 11/2010 | Winner et al. |
| 8,032,351 B2 | 10/2011 | Stringham |
| 8,032,868 B2 | 10/2011 | Bates |
| 8,065,676 B1 | 11/2011 | Sahai et al. |
| 2009/0187750 A1 | 7/2009 | Bugnion |
| 2009/0282101 A1 * | 11/2009 | Lim ..................... G06F 9/5077 709/203 |

FOREIGN PATENT DOCUMENTS

| | | |
|---|---|---|
| JP | 02156334 A | 6/1990 |
| JP | 02181282 A | 7/1990 |
| JP | 02187830 A | 7/1990 |
| JP | 3033937 A | 2/1991 |
| JP | 3204731 A | 9/1991 |
| JP | 05216689 | 8/1993 |
| JP | 07334372 A | 12/1995 |
| JP | 08036496 A | 2/1996 |
| JP | 08305583 A | 11/1996 |

OTHER PUBLICATIONS

Erik Seligman et al., "High-Level Fault Tolerance in Distributed Programs," Dec. 1994, School of Computer Science, Carnegie Mellon University.

(56) References Cited

OTHER PUBLICATIONS

Popek G., "Formal Requirements for Virtualizable Third Generation Architectures," Communications of ACM, vol. 17, No. 7, pp. 412-421, 1974.
Reinhart, S., et al., "The Wisconsin Wind Tunnel: Virtual Prototyping of Parallel Computers," ACM Sigmetrics 5/93/CA, USA, pp. 48-60, 1993.
Rosenbaum, et al., "Implementing efficient fault containment for multiprocessors," Comm. of the ACM, vol. 39, No. 9, 1996.
Rosenbaum et al., "Using the SimOS Machine Simulator to Study Complex Computer Systems," ACM Trans. Modeling and Computer Simulation, vol. 7, No. 1, Jan. 1997, pp. 78-103.
Lim et al. U.S. Appl. No. 10/921,417, filed Aug. 16, 2004, entitled, "Mechanism for Computer State Checkpointing and Restoration."
Amdahl Corp., "Millennium 2000A Series servers, General Information Guide," pp. 3-27, 2000.
Amdahl, Corp., "Product Announcement, Amdahl VM/Performance Enhancement, Product No. 4PV0-P1," Nov. 29, 1978.
Amdahl Corp., "VM/Performance Enhancement General Information," 1978.
Constantine P. Sapuntzakis, "Optimizing the Migration of Virtual Computers," 2002.
Optimizing the Migration of Virtual Computers, 2002.
Amdahl, Corp., "VM/Performance Enhancement, Release 3," undated.
Asche, R.R., "The Little Device Driver Writer," web content from www.microsoft.com, pp. 1-22, Mar. 24, 2003.
Bedichek, R., "Some Efficient Architecture Simulation Techniques," Department of Computer Science, FR-35, University of Washington Seattle, Washington, date unknown.
Bedichek, R. "Talisman: Fast and Accurate Multi-computer Simulation," Sigmetrics '95, Ottawa, Ontario, Canada, pp. 14-24, 1995.
Borden, T.L., et al., "Multiple operating systems on one processor complex," IBM Systems Journal, vol. 28, No. 1, pp. 104-129, 1989.
Bressoud et al., "Hypervisor-based Fault Tolerance," SIGOPS/95, Dec. 1995, pp. 7-77.
Bugnion et al., "Disco: Running Commodity Operating Systems on Scalable Multiprocessors," AM Trans. Computer Systems, vol. 15, No. 4, Nov. 1997, pp. 412-447.
Buzen, J.P., et al., "Introduction to Virtual Machines," Honeywell Computer Journal, pp. 254-250, date unknown.
Landau, C., "The Checkpoint Mechanism in KeyKos," Proceedings of the Second International Workshop on Object Orientation in Operating Systems, Sep. 1992.
Chapin, J. et al., "Hive: Fault Containment for Shared-memory Multiprocessors," Standford Computer Systems Lab Publication, ACM Symposium, Dec. 1995.
Cmelik et al., "Shade: A Fast Instruction-Set Simulator for Execution Profiling," ACM Sigmetrics, 1994.
Creasy, "The Origin of the VM/370 Time-Sharing System," IBM, J. Res. Develop., vol. 25, No. 5, Sep. 1981.
De Jone, et al., "The Logical Disk: A New Approach to Improving File Systes," in Proceedings of the 14th ACM Symposium on Operating System Principles, pp. 15-28, Dec. 1993.
Deutsch, L.P. "Efficient Implementation of the Small-talk-80 System," ACM 0-89791-125-3/84/001/0297, pp. 297-302, 1983.
Doran, R.W. (Amdahl Corp.) Amdahl Multiple-Do-mian Architecture, pp. 2028, Oct. 1988.
Ebciouglu et al., "Daisy: Dynamic Compilation for 100% Architectural Compatibility." IBM Research Report RC 20538, Aug. 5, 1996.
Galley, S.W., "PDP-10 Virtual Machines," Project MAC, Massachusetts Institute of Technology, pp. 30-34, date unknown.
Goldberg, R.P., "Survey of Virtual Machine Research," Honeywell Information Systems and Harvard University, pp. 34-45, 1974.
Hall, J.S. et al., "Virtualizing the VAX Architecture," ACM-0-89791-394-9/91/0005/0380, pp. 380-389, 1991.
Hazzah, K., "Writing Windows VxDx and Device Drivers," R&D Books, Lawrence, Kansas, pp. i-iii and 1-8, 1997.
Hitz, D. et al., "The File System Design for a File Server Appliance," Proceedings of the 1994 Winter USENIX Technical Conference, pp. 235-245, San Francisco, CA, Jan. 1994.
Hookway, R. et al., Digital FX132: Combining Emulation and Binary Translation,: Digital Technical Journal vol. 9, No. 1, pp. 3-12, 1997.
Howard, J. et al., "Scale and Performance in a Distributed File System," ACM Transactions on Computer System, 6 (1): 51-81, Feb. 1988.
Intel Corporation, "Intel 80386 System Software Writer's Guide," Chapter 9, 1987.
Lee, et al., "Petal: Distributed Virtual Disks," Proc. 1 "Intl. Conf. On Architectural Support for Programming Languages and Operating Systems," pp. 84-92, Oct. 1996.
Lerche, R.A., (Amdahl Corp.), "VM/Performance Enhancement Technical Information Exchange," pp. i-iii and 3-12, Aug. 1979.
Liedtke, J., "Toward Real Microkernels," Communications of the ACM Sep. 1996.
Litzkow, M. et al. "Supporting Checkpointing and Process Migration Outside the UNIX Kernel," Proceedings of the 1994 Winter USENIX Technical Conference, San Francisco, CA Jan. 1992.
Mackinnon, R.A., "The changing virtual machine environment: Interfaces to real hardware, virtual hardware, and other virtual machines," IBM Syst., J. vol. 18, No. 1, 1979.
Malan, G. et al., "DOS as Mach 3.0 Application," School of Computer Science, Carnegie Mellon University, undated.
Mallach, E.G., "On the Relationship Between Virtual Machines and Emulators," Honeywell Information Systems, Billerica, Massachusetts, pp. 117-126, date unknown.
Microsoft Corporation, "Microsoft Windows/386: Creating a Virtual Machine Environment," Microsoft Systems Journal, vol. 2, No. 4, Sep. 1987.
Litzkow, et al., "Checkpoint of Migration of UNIX Processes in the Condor Distributed Processing System," M. University of Wisconsin-Madison Computer Sciences Technical Report #1346, Apr. 1997.

\* cited by examiner

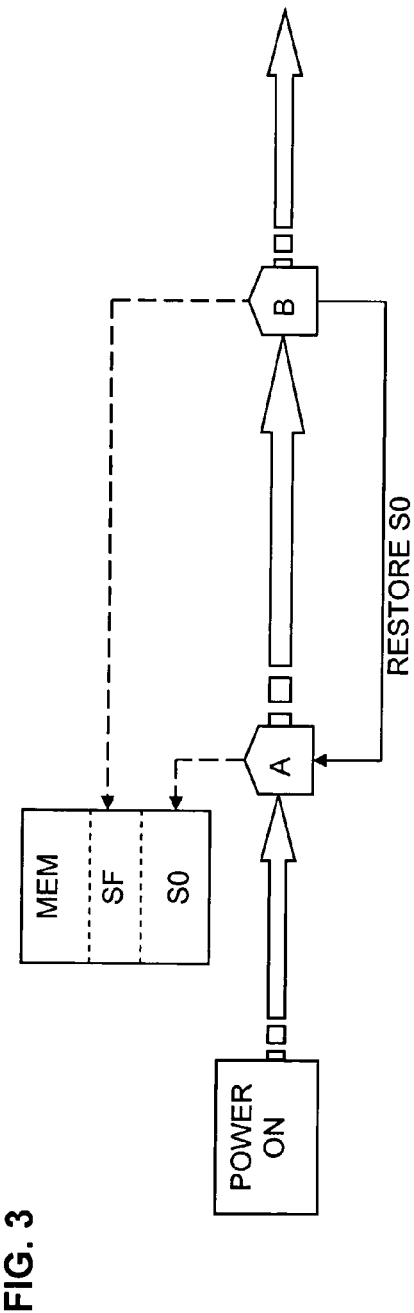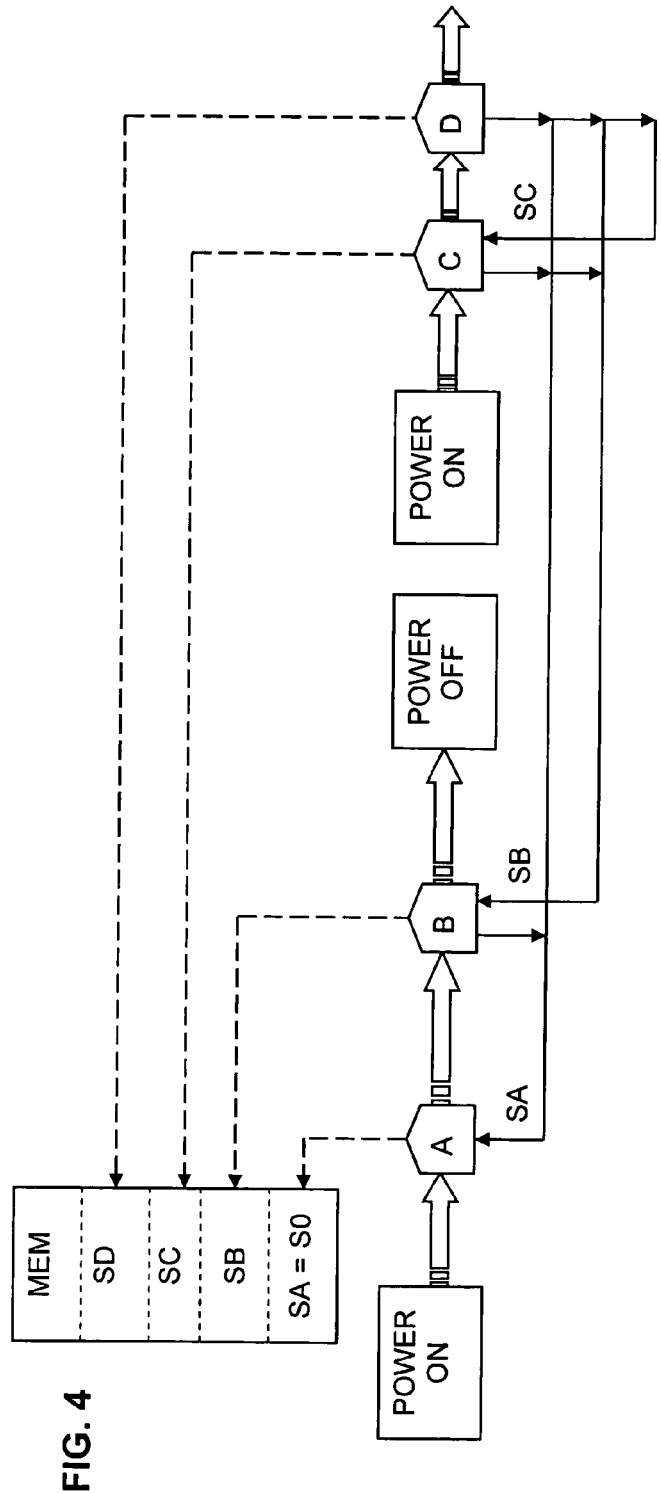
FIG. 3
FIG. 4

MECHANISM FOR PROVIDING VIRTUAL MACHINES FOR USE BY MULTIPLE USERS

CROSS-REFERENCE TO RELATED APPLICATIONS

This application is a Continuation of U.S. patent application Ser. No. 12/508,506, filed 23 Jul. 2009, which issued on 14 Jan. 2014 as U.S. Pat. No. 8,631,066; which is a Continuation of U.S. patent application Ser. No. 10/921,417, filed 16 Aug. 2004, which is now abandoned; which is a Continuation of U.S. patent application Ser. No. 09/497,978, filed 4 Feb. 2000, which issued on 21Sep. 2004 as U.S. Pat. No. 6,795,966; which is a Continuation-in-Part of U.S. patent application Ser. No. 09/151,175, filed on 10 Sep. 1998, which issued on 17 Dec. 2002 as U.S. Pat. No. 6,496,847 and claimed priority of U.S. Provisional Application No. 60/118,862, filed 5 Feb. 1999.

This application also incorporates by reference U.S. patent application Ser. No. 09/179,137, "Virtualization System Including a Virtual Machine Monitor for a Computer with a Segmented Architecture," filed 26 Oct. 1998, which issued as U.S. Pat. No. 6,397,242 on 28 May 2002.

BACKGROUND OF THE INVENTION

1. Field of the Invention

This application relates to an arrangement of a computer system, in particular, to a system and a method for acquiring, storing and using data concerning the state of hardware and software components within the computer system.

2. Description of the Related Art

Modern computers "crash" with irritating frequency, with much work lost or recovered only with time-consuming effort. Sometimes, crashes or other errors are expected, for example, when designing new software or debugging an existing program. In such cases, and even when first turning the computer on, time is also lost waiting for computers to "boot" or "reboot." At other times, when problems occur for an ordinary user of a commercial application, even more time is often lost when the frustrated user must try to explain orally what has happened to a technician located far away in a customer service department. These are just a few of many possible examples of situations when information about the state of the computer system is either desirable, for example, when debugging a new program, or necessary, for example, when the computer is to reboot and automatically load previously running applications along with the data they were processing when exited.

One known attempt to ensure the ability to analyze and reconstruct the state of a physical memory, disk or data base is based on the concept of a "transaction," which involves on-going tracking of updates to at least one region of storage. In this context, a transaction is a collection of updates that are bundled together so that they are atomic that is, either all of the updates occur, or none of them occur. The idea of transactions is typically applied to databases, where a series of updates to different tables need to occur simultaneously.

A transaction proceeds as follows: A begin command from the operating system or an application marks the beginning of the series of updates that make up the transaction. After the updates complete, a commit command marks the end of the transaction and the updates become permanent. If an error occurs during one of the updates that are part of the transaction, a rollback command is used to undo any updates in the transaction that may have completed.

Transactional Disks

In the prior art, this use of the concept of transactions is commonly implemented in database systems. Recently, transactions have been extended to apply to logical disks (also referred to as virtual disks), which are a software construct that emulate physical disks. One example of this solution, in the context of a parallel or distributed processing arrangement, is described in U.S. Pat. No. 5,634,096 (Baylor, et al., 27 May 1997, "Using virtual disks for disk system checkpointing"), which discloses a scheme for storing data on disks in such a way that a "checkpoint" is taken across several disks connected to different processors. This checkpoint is then used to restore the entire disk system to a known state after one or more of the disks or processors fails.

Yet another solution involving virtual disks is described in "The Logical Disk: A New Approach to Improving File Systems," by de Jonge, Kaashoek, and Hsieh, in *Proceedings of the 14th ACM Symposium on Operating System Principles*, pp. 15-28, December 1993. In this paper, the term "Atomic Recovery Unit" is used to describe transactions to the logical disk.

The implementation of a logical disk requires the interception of requests to the physical disk, and transforming them into operations on a logical disk. Once this has been accomplished, it is possible to keep a log of all of the updates to the logical disk and defer the update so that the original data is not overwritten. When the updates are kept in a log in this fashion, then a rollback can be accomplished by discarding the updates in the log for a particular transaction. A commit can be accomplished by retaining these updates in the log, and eventually applying them to the logical disk. A similar concept has been proposed in "Petal: Distributed Virtual Disks," by Lee and Thekkath, in *Proc.* 1 *"Intl. Conf. On Architectural Support for Programming Languages and Operating Systems*," pp. 84-92, October 1996. The Petal virtual disk supports the ability to take snapshots of the virtual disk, using techniques known as "copy-on-write." Copy-on-write is a common technique that allows copies to be created quickly, using a table of pointers to the actual data, and only copying the data when it is modified by a user program.

In Petal, the virtual disk itself is implemented as a table of pointers, and the snapshot (equivalent to a "checkpoint") is implemented by including an identifier (called an epoch number) in this table. When a snapshot is taken, the current epoch number is assigned to the snapshot. The epoch number is then incremented, and all subsequent updates to the virtual disk belong to this new epoch number. When a block of the disk is next updated, there will be no copy at the current epoch number, so a copy of the block will be created. In short, as the term "copy-on-write" implies, a copy is made only when a disk block is written to. The original data is still available, under the epoch number of the snapshot.

Both the logging technique and the snapshot technique allow the implementation of transactions on a logical disk. In both cases, there are two copies of the modified disk block: the original version and the updated version. By restoring the state of the logical disk to point to the original version of all the disk blocks that were modified during the transaction, the transaction can be rolled back, that is, the state of the disk at the beginning of the transaction can be restored.

The concepts of transactions on virtual disks and snapshots of virtual disks have a number of limitations. The first is that they are useful only in the context of restoring the state of the disk: These systems provide no way to recover from, for example, failures caused by errors in a peripheral device.

Another limitation is that, during the operation of a typical computer system, the state of the disk is not complete: Modern operating systems employ disk caches that contain copies of data from the disk, as well as data that needs to be written to the disk. Applications also buffer data, so that even the operating system itself lacks a complete view of all the data entered by a user of the computer system. Snapshots of the disk state taken at an arbitrary point are only as consistent as the disk would be if the computer system were to crash at that point. On the other hand, any data that is present in the cache or in application memory, but that is not yet written to disk, is lost.

If snapshots of the disk state are taken only at points when the operating system is shut down, then the disk is in a consistent state, and no data is lost. However, this represents a significant limitation on the concept of transactions: Before a transaction can begin or end, all applications must be closed and the operating system must be shut down. This makes the snapshot technique inadequate to restore the full state of the disk when the system or an application "crashes," that is, when an application terminates other than as a result of a prescribed shut-down routine and whose execution cannot proceed. Alternatively, the application or operating system must explicitly issue commands that cause the buffered or cached data to be written back to the disk. In short, the reality of modern systems does not always conform to the "clean" assumptions of the snapshot model, or they require the explicit coordination of application or operating system software.

The technique of taking snapshots (also known as "checkpointing") has also been used not only for virtual disks, but also for other subsystems such as file systems. Moreover, checkpointing has also been proposed for applications, and, in certain very restricted senses and cases, for systems as a whole. Examples of each will now be given.

File System Checkpointing

One example of checkpointing of file systems is disclosed in "Deciding when to forget in the Elephant file system," D. Santry, et al., Proceedings of the 17th ACM Symposium on Operating Systems Principles, Charleston, S.C. This "Elephant File System" uses copy-on-write techniques, as well as per-file characteristics to implement checkpointing of the file system, albeit only on a file-by-file basis.

Other checkpointing techniques for file systems are described in "File system design for a file server appliance," D. Hitz, et al., Proceedings of the 1994 Winter USENIX Technical Conference, pages 235-245, San Francisco, Calif., January 1994; and "Scale and performance in a distributed file system," J. Howard, et al., ACM Transactions on Computer Systems, 6(1):51-81, February, 1988. In both of these systems, copy-on-write techniques are used to create whole file system checkpoints.

System Checkpointing

Many different proposals have also been put forward for checkpointing systems in certain restricted situations. One such proposal for the system known as KeyKOS is described, for example, in "The Checkpoint Mechanism in KeyKOS," C. Landau, Proceedings of the Second International Workshop on Object Orientation in Operating Systems, September 1992. The KeyKOS system, which operates as a microkernel-based operating system (OS), treats an entire system (from a software perspective) as a collection of objects and periodically takes checkpoints of all the objects. After a crash, the objects can be restored and the system resumed. One shortcoming of the KeyKOS system is that it requires new system software to be written, in particular, new application program interfaces (API's). Yet another disadvantage of KeyKOS is that, after a crash, the OS still needs to go through a boot-up process before restoring the objects.

Still another known system-checkpointing technique is described in "EROS: a fast capability system," J. Shapiro, et al., Proceedings of the 17th ACM Symposium on Operating Systems Principles (SOSP '99), December 1999, Charleston, S.C. Like KeyKOS, this EROS system is an object-oriented operating system with objects that are made persistent by checkpointing them. This checkpointing requires that all state resides in special objects called "pages" and "nodes," and that all kernel (OS) operations are atomic. Like KeyKOS, the system requires a new API, that is, new software, to be written, and requires O/S coordination. In EROS, periodic copies (checkpoints) are made of all objects, which are saved using copy-on-write techniques. Also like KeyKOS, the EROS system requires an O/S reboot after a crash.

As its title implies, U.S. Pat. No. 5,715,464 (Crump, et al., 3 Feb. 1998, "Computer system having suspend once resume many sessions") describes a computer system that has suspend once resume many (SORM) sessions. This SORM arrangement operates in a manner similar to the way in which existing portable computers are able to "suspend" their operation, for example, when the lid is closed, and then resume operation when reactivated. In the SORM system described in the Crump '464 patent, however, the suspended image is preserved after resuming and thus may be restored multiple times, although subject to the very restrictive condition that the suspended image may no longer be valid after the next disk access in a resumed system. Moreover, the disclosed system-checkpointing solution describes possibility of keeping multiple suspended images, each for a different operating system, so that one can alternate between running the suspended operating systems.

Yet another system with features similar to the suspend-to-disk features of a portable computer is disclosed in U.S. Pat. No. 5,758,174 (Crump, et al., 26 May 1998, "Computer system having a plurality of stored system capability states from which to resume"). In this system, multiple suspended images may be kept and the user may resume from any one of them.

In both the Crump '464 and '174 systems, the operating system (OS) and application software must participate in the suspension and must go through a shutdown and a wake-up phase. In particular, these known systems require software executing within the operating system, such as an Advanced Power Management (APM) driver, and applications/subsystems to register with the APM driver. Furthermore, each suspended image must belong to a different OS, or instance of an OS, since the image does not include the state of the disk at the time the system was suspended. Resuming an OS will thus alter the contents of the disk associated with that OS at the next occurrence of a disk write, causing any suspended image associated with that OS to be inconsistent with the state of the disk. Another limitation is that neither system employs any form of copy-on-write techniques to reduce the amount of saved state.

Still another system of this type is described in U.S. Pat. No. 5,386,552 (Garney, et al., 31 Jan. 1995, "Preservation of a computer system processing state in a mass storage"). In this system, the contents of system registers and system memory are saved in a mass storage device upon the occurrence of a triggering event, such as during power-off or when the system is to enter a low-power mode. The system then enters a suspend state. Once processing is resumed, the contents of a previously saved processing state are read in and control is returned to the previously running application program. This system requires two separate modules—a special interrupt handler and a system management module—to handle saving different partitions—isolated and non-isolated—of the memory.

As in other suspend-and-resume systems, in the Garney system, the evolution of the computer system state is always moving forward in a linear trajectory. In other words, once the system is resumed, there is no way to go back to the previously suspended state. This is in part because the contents of the disk, which are not saved when the system enters the suspend state, may be freely modified after resuming—any post-resume modification prevents resuming again from the previously saved state. Thus, it is not possible to resume multiple times from a saved image. It is also not possible to save the state, continue execution, and then resume later from the saved state.

The Garney system also illustrates another common disadvantage of existing arrangements that provide for saving at least some part of the system state: It requires that software within the system itself must participate in saving the system state. Thus, in order to save the partial state in the Garney system, the additional system software needs to cause the processor to go into a system management interrupt state so that it can access a system management memory area. The processor must also be in the system management interrupt state in order to ensure that a critical part of the save routine will not be interrupted by a hardware interrupt.

Application/Process-Level Checkpointing

One known system for checkpointing applications is the "Condor" distributed processing system, which is described in "Checkpoint and Migration of UNIX Processes in the Condor Distributed Processing System," M. Litzkow, et al., University of Wisconsin-Madison Computer Sciences Technical Report #1346, April 1997; and "Supporting Checkpointing and Process Migration Outside the UNIX Kernel," M. Litzkow, et al., Proceedings of the 1994 Winter USENIX Technical Conference, San Francisco, Calif., January 1992. The Condor system checkpoints the processes of running applications, and can migrate them to other machines as long as these also are running Condor. Only the application state is checkpointed, however, and the applications themselves must participate in the checkpointing by making calls to a checkpoint library.

All of the known systems and methods mentioned above suffer from one or more of the following disadvantages:

They save only part of the entire system state; as such, they cannot ensure complete restoration of the system state sufficient to guarantee that all applications will be able to continue exactly as they would have when the saved state is restored.

They are not able to generate checkpoints and save the state of the system at arbitrary points, or at multiple points. The systems will therefore not correctly save the partial state except when processing is interrupted at specific points or under specific conditions. This implies, of course, that there will be circumstances when the state cannot be saved at all. This means, in turn that such systems cannot be used for such operations as full-state, step-by-step debugging of applications. In many cases, this limitation is caused by a need for synchronization of the partial state-saving procedure with applications, or a need to wait for some other internal process—such as a shut down of some sub-system—to be completed before saving the partial state.

They require specialized system software such as special API's or operating systems. Alternatively, they assume and work only for particular operating systems and hardware architectures. They are therefore not beneficial to the most common users—those who need to run off-the-shelf applications using an off-the-shelf operating system. An additional consequence of this is that the checkpoints are not portable between different systems.

They need to flush disk caches.

What is needed is some way to overcome these disadvantages of the prior art, and in particular, to extract and restore the entire state of the computer system as a whole, not just of some portion of the memory. This then would enable complete restoration of the system to any point in its processing without requiring any application or operating system intervention, or any specialized or particular system software (such as API's and OS's) or hardware architecture. This invention provides a system and method that accomplishes this, and it does so in a way that makes possible even other unique features, such as the ability for one or even multiple users to run, evaluate, test, restart, and duplicate a processing stream not only from the same point, but also from different points. The invention accomplishes this, moreover, in a manner that allows checkpointing the entire state of the system in a way that allows state information to be portable between different hardware platforms and system software configurations.

SUMMARY OF THE INVENTION

Embodiments of the invention comprise methods, computer systems and computer program products.

One embodiment is a method for allowing multiple users to share a common computer system image. The method comprises: generating a state vector representing the total machine state for a virtual machine configured with one or more commonly used applications; establishing the state vector for the virtual machine as a read-only common computer system image for use by multiple users; loading the state vector into a first virtual machine for use by a first user and into a second virtual machine for use by a second user; and allowing the first user to use the first virtual machine and allowing the second user to use the second virtual machine, and allowing the first and second users to enter different data in the first and second virtual machines, respectively, so that the processing paths of the first and second virtual machines diverge.

In another embodiment, the common computer system image is stored on a server computer, the first user accesses the common computer system image on the server computer from a first client computer and the second user accesses the common computer system image on the server computer from a second client computer. In another embodiment, updates to the common computer system image are kept in local storage on the client computers. In another embodiment, the method further comprises, at a later time, loading the state vector into a third virtual machine for use by a third user, allowing the third user to use the third virtual machine, and allowing the third user to enter different data so that the processing path of the third virtual machine diverges from the processing paths of the first and second virtual machines. In another embodiment, the method further comprises, at a later time, loading the state vector into a third virtual machine for use by a third user, allowing the third user to use the third virtual machine, and allowing the third user to enter different data so that the processing path of the third virtual machine diverges from the processing paths of the first and second virtual machines, wherein the third user accesses the common computer system image on the server computer from a third client computer. In another embodiment, the method further comprises generating a checkpoint of the first virtual machine, transferring the checkpoint of the first virtual machine to a first client computer, restoring the checkpoint of the first virtual machine in a first remote virtual machine in the first client computer and allowing the first user to use the first remote virtual machine in the first client computer; and generating a checkpoint of the second virtual machine, transferring the checkpoint of the second virtual machine to a second client computer, restoring the checkpoint of the second virtual machine in a second remote virtual machine in the second client computer and allowing the second user to use the second remote virtual machine in the second client computer. In another embodiment, the checkpoint of the first virtual machine is transferred to the first client computer and the checkpoint of the second virtual machine is transferred to the second client computer using a network.

Another embodiment is a method for providing a common virtual machine to each of multiple users. The method comprises: generating a state vector representing the total machine state for a source virtual machine running on a first computer; transferring the state vector to a second computer, restoring the state vector in a first remote virtual machine on the second computer and allowing a first user to use the first remote virtual machine on the second computer; and transferring the state vector to a third computer, restoring the state vector in a second remote virtual machine on the third computer and allowing a second user to use the second remote virtual machine on the third computer, wherein the first user and the second user enter different data so that the processing paths of the first remote virtual machine and the second remote virtual machine diverge.

In another embodiment, the first user and the second user also change parameters differently between the first remote virtual machine and the second remote virtual machine. In another embodiment, the state vector is kept on the first computer in a read-only state. In another embodiment, the state vector is transferred to the second computer and to the third computer using a network. In another embodiment, the state vector is transferred to the second computer and to the third computer using a disk. In another embodiment, the first computer is a central server.

BRIEF DESCRIPTION OF THE DRAWINGS

FIG. 3 illustrates the concept of a transaction and method according to the invention in which a system such as a virtual machine, at the completion of a transaction, can be restored to its state at the beginning of the transaction.

FIG. 4 illustrates an embodiment of the invention in which the state of the computer system (which is preferably a virtual machine) can be extracted and stored and for multiple checkpoints, and how a transaction according to the invention can extend even over a period when the system is turned off.

DETAILED DESCRIPTION

Figure 1:
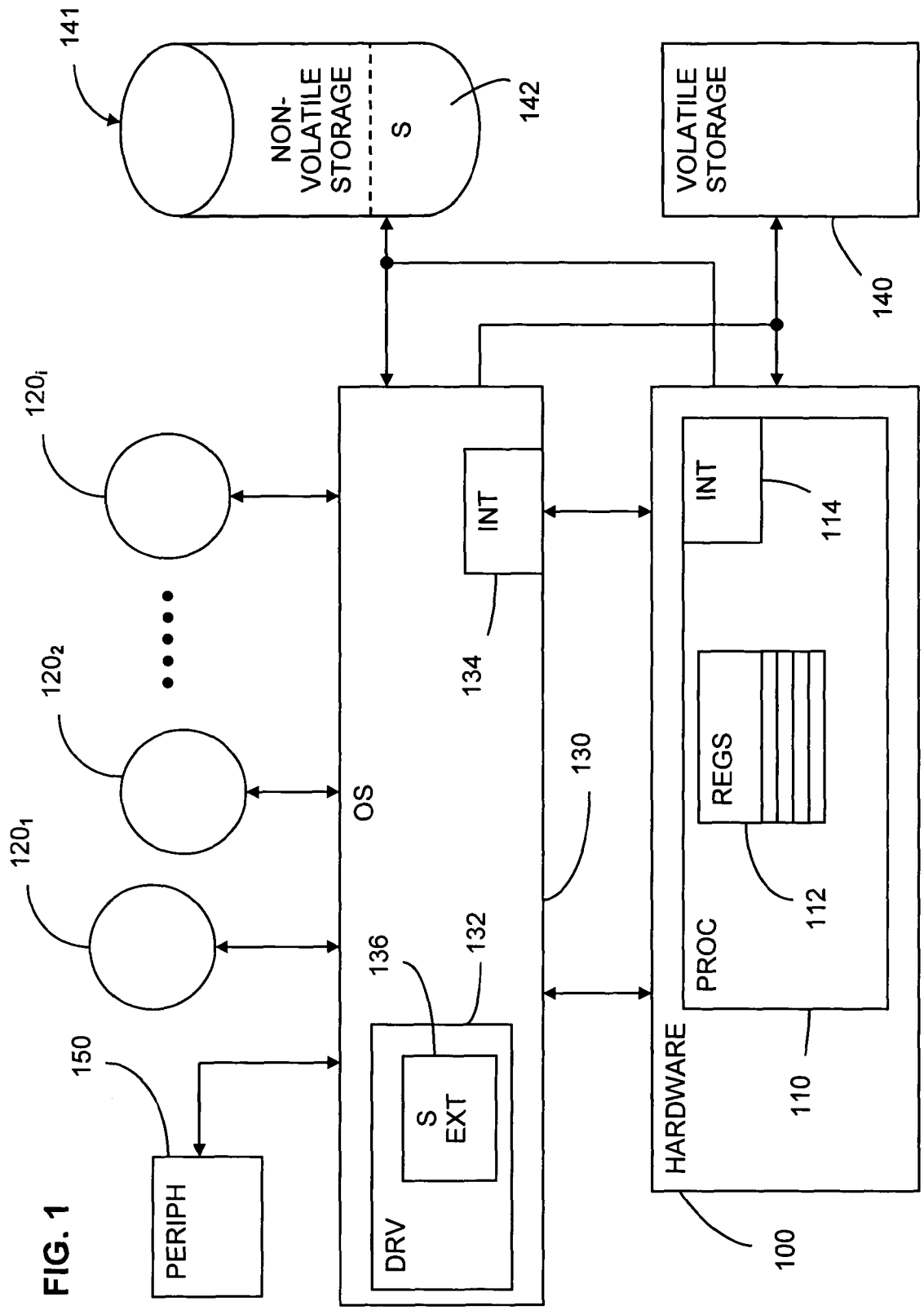
FIG. 1 illustrates the main hardware and software components of a standard computer system, but including a state extraction module within an operating system.

Central to an understanding of the preferred embodiment of this invention is an understanding of the concepts of the "total state" of a computer system, as well as of a "checkpoint" as used in this description of the invention. Assume a typical computer system. This system will at least include hardware such as one or more processors, a system memory (typically RAM) for high-speed, volatile and/or non-volatile storage (including a temporary cache), one or more peripheral devices, at least one mass storage device such as a hard disk, and conventional support circuitry such as a power supply and a system clock. Peripheral devices commonly found in modern systems include various I/O devices such as a display monitor, a keyboard, some cursor control device (for example, a mouse, touch pad or trackball), a printer, a modem, and hardware devices such as sound video cards. All of these hardware devices are represented internally in the machine, that is, the computer system, and their status (connected/disconnected, active/inactive, etc.) and current settings are defined as a set of stored parameters.

The system will also usually include software such as an operating system, device drivers, and system programs such as the boot-up routine. Of course, from the perspective of most users, the most apparent software in the system consists of the actual application programs—such as a word processor, a development tool, games, a network browser, etc.—that are loaded into either mass storage or the system memory. Any given instant, all of the software and all of its static and dynamic operating settings, associated files, application buffers, etc., are also stored either on the mass storage device (such as a hard disk), or in system RAM, or both.

In describing the various components of a computer system, the term "storage" commonly refers to any device capable of storing data and includes system memory, caches, non-volatile memory, and mass storage devices such as hard disks. The term "non-volatile storage" commonly refers to any storage device whose state is not lost when power is removed from the system, such as a hard disk. The term "volatile storage" commonly refers to any storage device whose state is lost when power is removed from the system, such as the system memory and caches.

Within the processor, or in dedicated memory circuitry, are also various registers. The number and type of registers vary depending on the particular processor and system architecture, but are in every given case well defined. One register, for example, will typically be an instruction pointer that indicates to the processor from which memory address it is to fetch its next instruction. Other registers contain various flags for enabling, disabling and determining the status of various interrupts, for indicating a current privilege level (in Intel x86-based systems), etc. In systems such as Intel x86-based systems that include segmented memory architectures, various pointers and tables, for example, descriptor tables, are also stored in memory to enable the processor and/or operating system to address and load the correct current memory segment.

The concept and definition of the total state of a computer system—the total machine state—is well understood by those skilled in the art of computer design. In short, the total machine state is the entire collection of all information that is necessary and sufficient to uniquely determine the status of all hardware and software components at the completion of any given processor instruction. Put differently, assume that the processor's execution is interrupted at the completion of any arbitrary instruction. The total machine state is then the set of data that, when loaded at any time into the appropriate memory positions (both internal and external to the processor), will cause the processor, and all connected hardware and software components, to continue executing in exactly the same way as if there had been no interruption at all. In any given implementation, the total machine state includes at least the "architected" state of the system. Each processor implementation will have different, but well defined, internal states, but all follow some architected state. All present Intel processors, for example, follow the IA-32 (x86) architecture. Similarly, many systems made by the Apple and IBM corporations conform to the Common Hardware Reference Platform (CHRP) system architecture.

The machine state can be represented as an encapsulation or enumeration, that is, a list or data structure—a state vector $S(e1, e2, \ldots, en)$—whose elements $e1, e2, \ldots, en$ are all the parameters, register values, I/O and other peripheral device settings, buffer and cache contents, disk and memory contents, etc., that define the state. Thus, the state can be represented and stored as a vector formed not only of individual parameters, but also of a concatenation of other lists, such as pages or sectors or blocks of memory. Saving of state information can be accomplished using normal techniques, whereby the processor can be directed using known, pre-stored instructions, that is, a program, to access and transfer into a specified storage area all of the elements of the state vector S. Different embodiments of the invention implement this state vector extraction and storage in different ways and are described below.

Defined broadly, this invention encapsulates the entire computer system by enumerating and storing its total machine state using software (or dedicated hardware) that need not be part of the system at all, and with no need for synchronization or control by system software or applications. This allows the invention, in some embodiments, to implement the concept of transactions (see above) on the entire state of the computer system. Thus, data that is in application buffers or in the disk cache of the operating system, as well as the data that is on the disk, is included in the transaction. Transactions can begin or end at any point during the operation of the computer system, without closing applications or shutting down the operating system. Alternatively, it may be desirable to allow certain operations to be completed, or to terminate certain operations before beginning or ending the transaction. An example where this might be appropriate is a network connection, or some other interaction with a device external to the computer system.

According to the invention, a transaction is implemented on a computer system as follows: First, to define the beginning of a transaction, some device or software module interrupts the system processor in any known manner and copies the total machine state of the computer system. The copy is accomplished by reading the state of the computer system and writing it to external storage, and can be done using known programming techniques. This initial saved state vector is referred to below as a starting checkpoint $S_0$. Next, all of the actions and updates that are part of the transaction are performed. Then, another, final checkpoint $S_F$ is created of the computer system state after the updates have been performed.

One use of the system according to the invention is that it allows a transaction to be rolled back, that is, to cause execution of instructions between two checkpoints to be "undone": To rollback the transaction, that is, to cause the computer system to execute from the initial checkpoint $S_0$ as if it had never been interrupted when the checkpoint $S_0$ was created, the state vector $S_0$ is restored, and the computer is started up in this state and allowed to execute until the final checkpoint $S_F$ is reached. If the execution is successful according to some predetermined definition, then the final checkpoint $S_F$ functions as a commit, and becomes the new starting checkpoint. If, however, an error occurs in processing before the final checkpoint $S_F$, then the computer system state $S_0$ is restored and processing can resume from this starting point. In short, a transaction is defined as all that happens from one checkpoint (machine state) to another. The execution of the transaction is "committed" only if no error occurs during the execution; if an error does occur, then the computer state is reset to its status at the beginning of the failed transaction, thereby allowing either analysis of the state, or continued execution of different instructions. The computer system can therefore proceed from checkpoint to checkpoint—transactionally—and can be reset as needed to the beginning of the current transaction.

Alternatively, rather than storing the entire system state at both the beginning and end of a transaction, a log can be kept of changes to the computer system state, that is, of any changes to any of the elements of $S_0$. This log can then be discarded to roll back the transaction, or it can be saved, or it can be applied to the first checkpoint to commit the transaction. If it is saved, the log of changes constitutes a second checkpoint, as long as the original checkpoint $S_0$ that it is based on is maintained in a read-only state. This is thus an application of the "copy-on-write" procedure to the entire machine state.

In the preferred embodiment of the invention, a combination of these two approaches—transactional execution using checkpoints, and copy-on-write updating—is used. For state which is small, such as hardware registers, or state that is likely to be entirely changed, such as random access memory, it is most efficient to make a complete copy of the entire state before and after the transaction. For state which is large and changes slowly, such as disk contents, it is more efficient to keep a log of the changes instead of a copy of the entire contents. For each system in which the invention is installed, the particular hardware and software configuration and how actively various loaded applications change their stored values, will determine to what extent copy-on-write techniques will be required. This can be determined by those skilled in the art using known design techniques. In the following, the term checkpoint is taken to mean either a complete copy of the total machine state, or one or more saved logs of changes that refers back to a prior read-only checkpoint. Those skilled in the art will recognize that each saved log may consist of multiple sections, each section containing the saved state of a particular system component. Further, the saved state of each system component may be the entire state of the component, or may be the changes that have been applied to the state of the component since the last saved log.

These concepts, and the manner in which checkpoints are used in different embodiments of the invention, will be better understood from the further description of the invention given below.

Implementation Issues

There are several pre-conditions to implementing a fully transactional computer system. First, the entire state of the computer and its peripherals should be accessible by software. Second, it should be possible to write all of this state information to some external storage device. Third, it should be possible to reload the state information and thus restore the state of the computer from the saved state. Fourth, it should be possible to restart the computer in the restored state.

Unfortunately, the pre-conditions above are not all typically met in common computer systems. It is, for example, common for hardware to have state information that is not visible. Certain architectures such as the Intel x86, for example, contain several memory segment registers, and each of these segments registers contains a part that is hidden to most software. Moreover, even when all of the state is visible, it is not always possible to restore all of this state to saved values, or to restart the computer in this new state. On the other hand, it will in many applications be acceptable for some parts of the state to be invisible as long as this state is transient and disappears at well-defined points—the creation of checkpoints and thus the storing of the state vector can be restricted to being carried out only at one of these points where all of the transient state is gone.

The preferred embodiment of the invention (described below) provides, however, an implementation in which the user operates only in a virtual space, that is, the user runs all applications on virtual machines. This allows the preferred embodiment of the invention to access and encapsulate all state information for all applications, regardless of the underlying hardware and its possibly incomplete state accessibility. These concepts are described in greater detail below.

FIG. 1 illustrates the main hardware and software components of a standard computer system. System hardware 100 includes a processor 110 (or two or more cooperating processors in a known multiprocessor arrangement), which includes, or is connected to, registers 112 and interrupt-handling circuitry 114. Various conventional applications $120_1$, $120_2$, ..., $120_i$ communicate with the hardware 100 and other system components via an operating system 130. Standard volatile and non-volatile storage devices 140, 141, respectively—referred to collectively as "storage"—are connected to the hardware 100 and can be accessed by the operating system 130, by the hardware 100, or, in some circumstances, directly by applications.

Conventional peripheral devices 150 are also connected either for direct control by the hardware 100 or via the operating system 130. The operating system 130 includes device drivers 132 for the various peripherals 150. Thus far, the main components of the computer system illustrated in FIG. 1, as well as their implementation and operation, are as in almost every common computer system and are as such very well known. What is also well known is that requests by applications $120_1$, $120_2$, ..., $120_i$ for managing and mapping memory, for control of peripherals 150 or access to data regarding their settings, etc., can be handled in whole or in part by the operating system 130. In operating systems such as those made by Microsoft, an Applications Program Interface (API) is usually included, for example, specifically to act as the interface between the operating system and applications. The operating system is also responsible for tracking memory portions allocated to each application, and for handling or at least setting up most data transfer between memory, applications and peripherals. As such, software at the system level, that is, at the level of the operating system, with direct communication with the hardware 100, will in most cases have access to the information that comprises the machine state. In particular, the operating system is able to construct the state vector S because it is able to access all storage, where the state of all software (including virtual machines, described below) resides.

In this embodiment of the invention, a state extraction driver 136 is therefore loaded into the operating system 130 to place in storage the elements of the state vector S whenever a command is issued to do so. As is explained further below, the driver 136 could store either the entire contents of storage relating to the applications, or simply updates, according to a copy-on-write scheme. This command will typically be issued either by an application, or from within the operating system itself, according to a parameter or routine set by the user. This is made clearer below. The state extraction driver 136 can be implemented using known programming techniques.

As is also explained in greater detail below, one purpose of extracting and storing the machine state S is that it allows this state to be reloaded. Of course, the very act of storing the machine state S changes the state itself. In order to prevent this inconsistency in the definition of the machine state, and potential ambiguity in memory addressing, each machine vector S (of which, as is explained below, there may be many), the storage is preferably partitioned, using known techniques, with the state vectors S being stored in a dedicated, exclusive region 142 of storage. The device used for storage is preferably non-volatile, which will allow state vectors to be read and restored even if the system has been powered off since state storage. In the following description of the invention, the term "storage" is used to indicate any device that is used to store one or more state vectors.

The embodiment of the invention shown in FIG. 1 extracts state information for a real, physical computer system, that is, from actual hardware registers, and requires only the loading of the driver 132 and the partitioning of storage. On the other hand, as is discussed above, if the processor 110 has state information that is not visible to the driver 136, or if the system fails to meet any of the other requirements mentioned above, then it may not be possible to convert the computer system into fully transactional system using this embodiment.

Fortunately, however, the preferred embodiment of the invention is able to convert even such an architecture into a fully transactional system. In order to understand the preferred embodiment of the invention, it is helpful first to recall certain concepts from the field of virtual machines.

Virtual Machine

As is well known, a virtual machine is a computer "system" that is typically implemented entirely in software on top of a "real," that is, physical, hardware platform and a "real" operating system, that is, an operating system that communicates directly with the hardware platform and other physical system components such as memory. In other words, a virtual machine is software that emulates a particular architecture and operating system, although actual processing and data storage is of course performed on the actual physical components, which are otherwise unknown to actual applications running on the virtual machine. The design and operation of virtual machines is well known in the art of computer science. Indeed, most modern personal computers include at least one virtual machine: A computer whose operating system is Microsoft Windows or Windows NT, for example, will allow most applications designed to run under the earlier Microsoft DOS to run on the Microsoft Windows or Windows NT machine as well. This is because such computers include a DOS virtual machine that runs on top of the Microsoft Windows and Windows NT operating systems.

Figure 2:
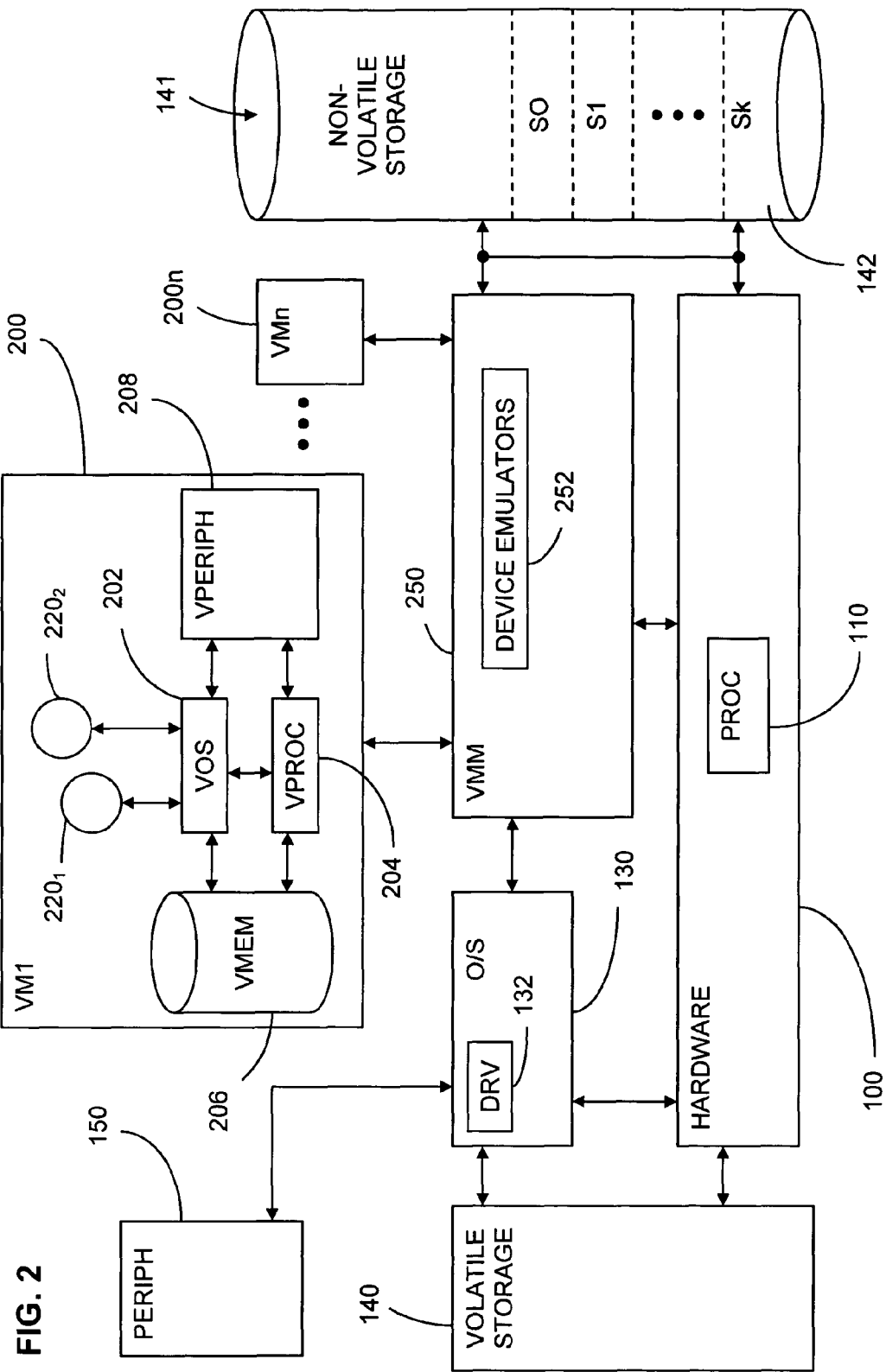
FIG. 2 illustrates the main hardware and software components of a preferred embodiment of the invention, in which a virtual machine monitor is used to extract entire state of at least one virtual machine running on the monitor.

See FIG. 2, in which a virtual machine (VM1) 200 is shown as including a virtual operating system (VOS) 202, a virtual processor (VPROC) 204, a "virtual disk," that is, virtual memory (VMEM) 206, and virtual peripheral devices 208, all of which are implemented in software to emulate the corresponding components of an actual computer. Applications $220_1$, $220_2$ (only two of which are shown merely for the sake of simplicity) are "loaded into," that is, associated with, the virtual machine 200 and run normally. These applications pass their instructions directly to the virtual operating system 202 instead and are in the form suitable for running on the type of processor that the virtual processor 204 emulates. In reality, however, all instructions generated by the applications will be carried out on the actual hardware 100, using actual peripheral devices 150 accessed and controlled by the operating system 130.

In fact, of course, all of the applications $220_1$, $220_2$, and the components of the virtual machine 200 are instructions and data stored in memory, just as any other software. Indeed, the same applies to other system software as well, such as the operating system 130 itself. These various software components are illustrated as separate modules merely for the sake of clarity.

Depending on how the interface between the virtual machine and either the hardware or the system operating system is handled, more than one virtual machine 200, . . . , 200n may be included in the system as a whole. In FIG. 2, the main components of only one virtual machine 200 are illustrated merely for the sake of simplicity—other virtual machines will have a similar structure. Note, however, that different virtual machines may have (but do not require) different virtual operating systems, different applications, etc.

In some known implementations, virtual machines are run directly on top of the operating system 130. As such they constitute applications like any other, for example, the applications $120_1$, . . . , $120_i$ shown in FIG. 1, except that they themselves have applications running on them. Of importance here, however, is that each virtual machine is, as far as the applications are concerned, a self-contained computer system. This means that each virtual machine will itself also have a total state vector S that characterizes the virtual machine. Moreover, all of the state of the virtual machine components will be visible to software. Consequently, all of the state of any given virtual machine may be accessed and stored; in other words, checkpoints may be established for any virtual machine at the completion of any virtual machine instruction.

If the virtual machines are installed to run directly on the operating system 130 (as if they were applications in FIG. 1), then the state extraction driver 136 may intercept all their instructions and data changes and construct the state vector whenever triggered to do so (see below). One problem with this configuration is that it assumes that all devices and functions needed by the applications $220_1$, $220_2$ can either be virtualized or that their state is visible to the operating system. As is pointed out above, however, this may not always be possible, or it may be possible only for certain types of virtual machines running on certain hardware platforms—note that the virtual machine must sooner or later communicate at least indirectly with some actual hardware.

Virtual Machine Monitor

In order to overcome the limitations of the embodiment described above, in which the virtual machines run directly on the operating system 130, the preferred embodiment of the invention instead interposes a virtual machine monitor 250 between the virtual machines 200, . . . , 200n and the system hardware. As is well known in the art, a virtual machine monitor is a layer of software that runs directly on top of the hardware and virtualizes at least some of the resources of the machine, or at least of some machine. Since the interface exported by the virtual machine monitor to the virtual machines is the same as the hardware interface of the machine, the virtual operating system 202 cannot even determine the presence of the VMM except possibly for certain especially time-critical processes. Consequently, when the hardware interface is compatible with the underlying hardware, the same operating system can run either on top of the virtual machine monitor or on top of the raw hardware.

Virtual machine monitors can also provide architectural compatibility between different processor architectures by using a technique known as either "binary emulation" or "binary translation" in which they emulate the virtual architecture on top of the underlying one. This allows entire virtual machines (operating systems and applications) written for a particular processor architecture to run on top of one another. Moreover, it allows any number of virtual machines having different virtual operating systems to run on a given physical platform and with a given operating system.

This can be particularly difficult when the underlying hardware assumes a segmented memory architecture such as in Intel x86 platforms. Nonetheless, it is possible: a system and method for accomplishing this is described in the co-pending U.S. patent application Ser. No. 09/179,137, "Virtualization System Including a Virtual Machine Monitor for a Computer with a Segmented Architecture," filed 26 Oct. 1998, which is incorporated into this application by reference. By combining direct execution and binary translation engines within a virtual machine monitor, the disclosed system is able to virtualize entire machines, even when the underlying hardware platforms are different.

FIG. 2 illustrates this preferred configuration, which is described in greater detail in the parent application, namely, U.S. patent application Ser. No. 09/151,175, "System and Method for Virtualizing Computer Systems." Using the preferred configuration, the virtual machine monitor 250 is able to virtualize the entire computer system, including the various system resources, and to access even the hidden parts of processor registers in systems such as the Intel x86.

In summary, the configuration described in the parent application involves installing the virtual machine monitor directly onto the hardware, that is, at the same system level as the operating system 130. A driver is then installed into the operating system to enable communication between the virtual machine monitor and peripheral device emulators.

A corresponding library of device emulation modules 252 is preferably included within the virtual machine monitor. These modules are exported to the attached virtual machines. In a preferred implementation of the invention, each device emulation module 252 is an emulation of a device that is representative of the particular class of device. To understand this further, consider the example of a peripheral, such as a modem, that allows communication with some form of network. In general, an application is not dependent on any particular type or brand of modem—a telephone dialing application, or a fax modem program, or an Internet web browser, assumes merely that there is a modem and one can change the system modem without having to modify the application. Consequently, as long as applications running in a virtual machine are able to communicate with some modem, that is, some representative implementation of the device, then they will work normally even if the modem they "believe" they are communicating with is not the actual physical system peripheral.

According to the invention, a representative emulation module is therefore preferably included in the virtual machine monitor 250 for each such application non-specific peripheral device. In effect, each such module is simply an interface that is exported to the respective virtual machines that responds as the particular device would. For each actual device, any known—but preferably widely used—existing device may be taken as the representative device that is emulated and exported to the virtual machines. Each device emulation module will then include any data conversion routines necessary for two-way conversion of device instructions and data between the formats used by the actual device and the virtual (emulated) device. The emulation of devices and conversion of data between formats can be done using well-known techniques in computer science; consequently, the emulation modules 252 may be programmed in any known manner.

One significant advantage of the use of exported device emulation modules is that only a single, well-defined module is required for each device (just as at most a single modem is typically required in a computer). This contrasts with the prior art, in which virtualized versions of a plurality of types of actual physical devices is exported. The single, exported emulation of devices by the virtual machine monitor 250 to the various virtual machines allows each virtual machine to be a complete virtual system in its own right, so that they are made independent of the underlying platform, that is, of the host system. The significance of this, which will be made clearer below, is that the entire state of each virtual machine will therefore also become platform-independent, so that each virtual system can be made portable, allowing it to be transmitted or moved to a different physical device via a transmission medium, or to be dynamically migrated (with no need to store the entire state) to other systems for continued processing, for example, to a server node that is less busy than a current node.

Note that it is not necessary for an emulation module to have an actual physical counterpart in the system. Rather, the virtual machine monitor may include emulation modules that are purely virtual. For example, assume that one wishes to test how a proposed, prototype peripheral device would work in a system. Using any of the many known simulation packages for hardware and software design, the designer could first create the associated emulation module, install it in the virtual machine monitor, and then test applications against it by running them on one of the virtual machines. Since the only interface between the device and the virtual machine is the emulation module—even for actual physical devices—then it will run as if an actual physical prototype been included in the physical system.

Key to this invention, however, is that a virtual machine monitor, especially as configured in the parent application, is able to access and thus to store the total machine state of any connected virtual machine at any given time, in contrast to the other systems mentioned above that store only incomplete parts of the system. This allows it to encapsulate, access and checkpoint the entire state of each and every virtual machine, independent of the others. Consequently, whether the state vector corresponds to an actual computer system, or, preferably, to a virtual machine, and whether the virtual machine is running directly on an operating system or on a virtual machine monitor, and whether the virtual machine monitor runs directly on the hardware, at system level, or on top of an existing operating system, all that is required for this invention is that either the virtual machine monitor or operating system should extract the state vector for the actual computer system or for a virtual machine. The degree to which the state vector is complete will determine the degree to which the transactional computer system that is implemented will be able to function in the various operational modes of the invention described below.

The embodiment of the invention with one or more virtual machines running on a system-level virtual machine monitor as in parent U.S. patent application Ser. No. 09/151,175, is able to extract the complete state vectors of virtual machines. The concept of the machine state for a virtual machine is the same as for a "real" machine: It is the enumeration (list) of all memory sectors, pages, blocks, or units, and indices and addresses allocated to the current virtual machine, the contents of all virtualized hardware registers, the settings for all virtualized drivers and peripherals, etc., that are stored in any storage device and that are necessary and sufficient that, when loaded into the physical system in the proper locations, cause the virtual machine to proceed with processing in an identical manner.

The virtual machine monitor described in U.S. patent application Ser. No. 09/151,175 is even able to track portions of the machine state that are not otherwise visible to software, to restore this state to saved values, and to restart the corresponding virtual machine in the new (restored) state. In addition, if the logging technique described above is also implemented, then, for the sake of efficiency, the virtual machine monitor can also be programmed using known techniques to intercept all updates which are to be logged, and redirect them. The virtual machine monitor is for that reason the preferred embodiment. Examples of the different operational modes of the invention will now be described.

Full-State Suspend-Resume-and-Restore Mode

See FIG. 3. Assume that a computer is powered on (or, equivalently, in the virtual environment, that a current virtual machine is started) and runs (indicated by the broken, large, horizontal arrows) as normal. At point A, that is, at the conclusion of a particular (virtual) machine instruction, the machine is interrupted and its operation is suspended (using normal interrupt techniques). The state extraction mechanism (preferably, the virtual machine monitor) then extracts the machine state and saves it in storage (indicated by the dashed lines) as the initial checkpoint S0. The system is then resumed, preferably under the control of the virtual machine monitor or otherwise by the operating system, using standard programming techniques. Assume that a second interruption is generated at point B. This point (and all checkpoint interrupts) may be deliberately set, for example by encoding the interrupt into the normal instruction stream, or it may occur because of some error that leads to an interrupt. Note that the virtual machine monitor in the preferred embodiment is able to intercept and react to all such "unplanned" interrupts as well. The state vector SF, representing the state at instruction point B, is then preferably saved in storage.

If no further action is required, then both of the state vectors S0 and SF will be available in storage for analysis by the user. Assume, however, that the user wishes to start processing once again from checkpoint A, perhaps in order to repeat the processing that led up to the error state at checkpoint B. In this case, the user, by way of a conventional command that is intercepted and executed by the virtual machine monitor, directs the system (the virtual machine monitor) to restore the state vector S0, thereby setting the entire system in the same state that it was when it first reached checkpoint A. Processing may then be restarted from this point once again.

As this example illustrates, this invention thus makes it possible not only to suspend the machine and resume operation later from the suspend point, but also to do so an arbitrary number of times. In other words, because even the contents of the virtual memory (for example, virtual disk) are also stored as part of the state vector, later modification of the virtual memory will not affect the system's ability to restore the machine state completely and repeatedly to its former value.

In transactional terms, the processing steps from checkpoint A to checkpoint B constitute a transaction, checkpoint A marks a begin step, checkpoint B marks a commit step, and the process of restoring S0 is a rollback. Unlike in the prior art, however, in this case the entire state of the machine is stored, and the checkpoints A and B may be encoded at any point in the instruction stream, not necessarily at, for example, power-up, or after booting, or at power-down. It would be possible, however, to set the initial checkpoint A immediately after power-up, and the final checkpoint B immediately before power-off of the system. The invention allows a transaction to be defined with arbitrary beginning and end points, as long as they are at the completion of a machine instruction.

The total machine state at points where the virtual machine is powered off is a subset of the normal total state of the machine. In particular, it does not have to include the volatile machine state such as those in processor or device registers, or in system memory.

Assume instead that the user, upon analysis, is satisfied with the computer state at checkpoint B, that is, he wants processing to continue from checkpoint B, with no intervening restoration and re-running of the A-to-B transaction. In other words, assume that the user wishes to begin a new transaction from checkpoint B. All that is required is then that the checkpoint B state vector is set (by conventional address pointing or indexing) to be the new initial state vector and processing is simply resumed until some subsequent checkpoint is reached. The system can thus be suspended at any checkpoint and resumed from that checkpoint or rolled back to the earlier checkpoint.

Note that, once a previous state has been restored, it is not necessary for processing to continue along the same path. As FIG. 3 illustrates, for example, just because the system is returned to the checkpoint A state does not mean that it must proceed to checkpoint B in the same manner—the user may, for example, input different values or take different actions during the A-to-B transaction. Indeed, it is not necessary for the processing path to lead back to checkpoint B at all. For example, assume that checkpoint B is generated only on the occurrence of some error condition. If the error condition is not met, either on the first processing path from checkpoint A, or after user intervention in subsequent processing paths from checkpoint A, then the transaction will not need to end at checkpoint B. This is just one of many examples of the concept of different processing paths from one or more checkpoints. Additional examples are given below.

FIG. 4 illustrates an embodiment of the invention, similar to that shown in FIG. 3, but in which several checkpoints A, B, C and D are marked, and their respective state vectors are saved as SA (=S0, the initial checkpoint state), SB, SC, and SD. By restoring any of the state vectors SA, SB, SC from any later checkpoint, processing can also be started from the corresponding earlier checkpoint A, B or C. Since state vectors are preferably saved in non-volatile storage, such as the system disk, they will persist even after system power is turned off and back on again later. Using the invention, a transaction may thus extend over any period, including any number of power-on/power-off procedures, as long as the checkpoints are saved in non-volatile storage.

This multi-checkpoint embodiment of the invention is particularly useful in "debugging" or analyzing a program or piece of hardware: Note that it would be possible to set a checkpoint (by generating an interrupt) after completion of every instruction in a particular set. In other words, the invention makes it possible to step through a program and store the entire machine state after each instruction. The invention thus makes it possible to create a complete picture of the entire machine during execution of the entire program to be debugged, or any portion of it. Moreover, execution can be restarted from any checkpoint in the instruction set simply by reloading the state vector corresponding to the checkpoint.

Of course, each state vector may contain a large data set since the state also includes the contents of memory. The number of complete state vectors that can be stored at any one time will therefore be determined by the amount of available storage (for example, in a dedicated memory partition). The invention also provides a method for reducing the amount of storage needed for the state vectors: In particular, the preferred embodiment of the invention combines the checkpoint state technique described above with a copy-on-write procedure to disk. In this way, only updates to the state vectors from checkpoint to checkpoint need be stored, thus, in most cases, greatly reducing the storage demand. This is described further below.

A further possibility exists if the only use of the transactional capability made possible by the embodiments of the invention shown in FIGS. 3 and 4 is to stop the operation of the computer and to restart it later with no intervening change in the computer system state. This is commonly referred to as a "suspend and resume" capability, and is offered as a feature in many portable computer systems in order to save power during periods of inaction. However, in the prior art, this capability is limited in currently available systems to this single function, and is not possible at arbitrary points in an instruction stream—unlike in this invention, no provision is made for saving the state to external storage, or for starting the computer system in a different state from that in which it was stopped.

Simultaneous or Replicated Multi-Path Processing

Figure 5:
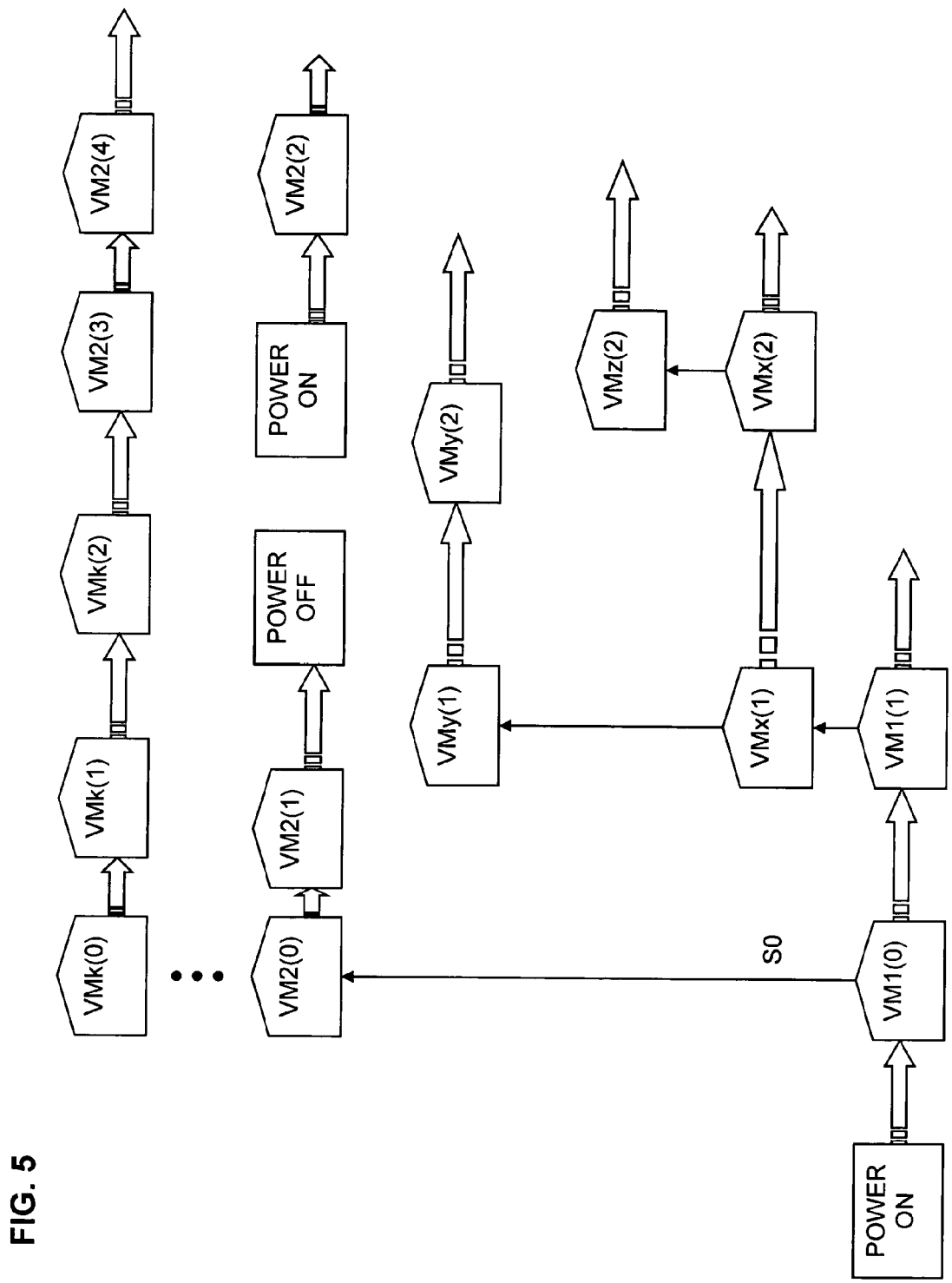
FIG. 5 illustrates an embodiment of the invention in which multiple, parallel processing paths may be run simultaneously using the invention.

FIG. 5 illustrates yet another unique and advantageous property of the invention: By loading state vectors from different checkpoints into different virtual machines, many different processing paths can be run, that is, tested, either simultaneously and in parallel, with no need to restore different states into the same virtual machine, or at least replicated on different virtual machines for separate processing. The only restriction is that the different virtual machines should have the same virtual architecture so that the state information will have the same—or at least a predictable—meaning in each.

Let VMi(j) be the j'th checkpoint of virtual machine i. Assume also that the state vector for the state of VMi at checkpoint j is saved in storage as described above. In the illustrated example, the state vector for the initial checkpoint 0 in a main processing path (VM1) is extracted and is also loaded into virtual machines VM2, . . . , VMk. These virtual machines can then proceed on their own processing paths. If all else remains the same, then these virtual machines will of course proceed identically. The user(s) of the virtual machines VM1, VM2, . . . , VMk, will, however, be able to enter different data or change parameters differently in the different virtual machines and thus cause the different processing paths to diverge. Different checkpoints may be set in the different processing paths. The state vector at VM1(2) is therefore not necessarily the same as the state vector at VM2 (2).

Within any given processing path—indeed, even in different processing paths—any stored state vector may be loaded into the corresponding virtual machine, or even into a different virtual machine, so that processing will proceed from the loaded state instead of along the path the virtual machine otherwise would have taken. A user could direct reloading of a state vector and thus restore an earlier state (even from a previous session, that is, before the latest power-on), as illustrated in FIGS. 3 and 4.

Note that, as FIG. 5 illustrates, the invention is not restricted to creating different processing paths from a single initial state. Rather, any number of different processing paths may be initiated from any checkpoint in any other path. For example, the initial state for the virtual machine VMx is shown as being the state at checkpoint VM1(1)—it is in other words not necessary to start all virtual machines from a single global initial state.

In this multi-path embodiment of the invention, each checkpoint (state vector) may be saved as a separate entity, or its successor checkpoint may replace it. For example, VM1(1) could either be stored, in addition to VM1(0), or it could replace it, thus forming the initial state for all subsequent processing steps. When a checkpoint replaces its predecessor, this is a commit, as the earlier checkpoint is no longer available. If checkpoints are maintained as a log of changes (the copy-on-write technique described below), then instead of overwriting the earlier checkpoint in its entirety, the commit is implemented by making the updates in the log on the earlier checkpoint.

As FIG. 5 illustrates, once a checkpoint has been created, it can serve as the basis for more than one distinct transaction (set of steps from one checkpoint to the next). This gives rise to a checkpoint tree, which allows a checkpoint to have multiple successors. When checkpoints are used in this fashion, some caution is in order. For example, suppose that two separate computer systems are started from the same checkpoint. After some updates have been performed on each of these systems, the state of the two systems can differ; thus VM2(1) is not necessarily the same as VM1(1). If both systems were to commit their transactions back to the same checkpoint, the updates would conflict, resulting in loss of data.

A solution to this problem of potentially conflicting restored checkpoints is to keep the original checkpoint in a read-only state, and to create new checkpoints when the transactions commit. These new checkpoints need not be complete copies of the computer system state, but rather only the state that is different from that of the original checkpoint.

New checkpoints, in turn, can also be the basis for more than one distinct transaction. The entire collection of checkpoints created in this way forms a tree structure (like in FIG. 5), that is, a "checkpoint tree." To prevent the loss of data, a preferred processing rule is that the internal nodes of this tree should be stored as read-only data, with only the most recently created—"leaf" nodes—being in read-write form. Whenever a leaf node of the checkpoint tree is used as the starting point for more than one computer system, then it should be kept in a read-only state as well. Note that this concept of checkpoint trees according to the invention can apply to transactions on virtual disks, as well as to transactions on entire computer systems.

Transmission of State to Remote Virtual Machines

Figure 6:
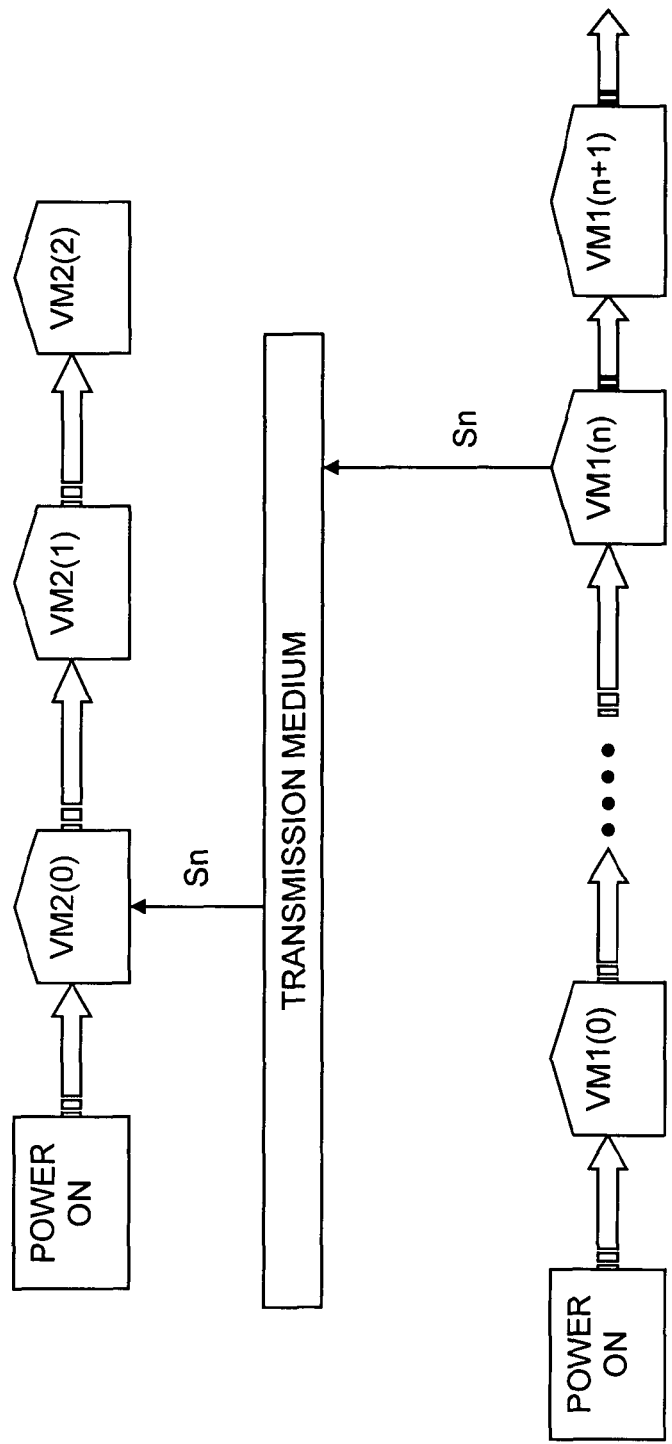
FIG. 6 illustrates an embodiment of the invention in which the state of a computer system can be installed into another physical system by transferring a system state vector over a transmission medium.

FIG. 6 illustrates yet another possibility according to the invention: It is not necessary for all virtual machines to be connected to the same virtual machine monitor, to run on the same physical system, or even to be located in the same place. Rather, as long as each virtual machine has the same virtual architecture, then it may proceed with processing from any state vector derived at a checkpoint of any other architecturally similar virtual machine. Thus, the state vector of a first virtual machine VM1, for example, at checkpoint VM1(n), could be transferred over any conventional transmission medium to any other architecturally similar virtual machine VM2 and loaded into that virtual machine as its initial state VM2(0); thus, in this example, VM1(n)=VM2(0). The transmission medium could be a standard memory disk or tape of sufficient capacity, or even a network such as the Internet or an internal network within an enterprise, with the state vector being transferred using any conventional format such as FTP. If the transmission medium is a network, the generation and subsequent transmission of the state vector need not involve any storage at all. A first virtual machine monitor may extract and transmit the state vector of a first virtual machine directly over the transmission medium to a second virtual machine monitor that receives and restores the state vector into a second virtual machine.

Processing from the common state can be done in parallel, or on only one of the virtual machines. In the case of parallel processing, this embodiment of the invention is thus a special case of multi-path processing, in which the paths may be carried out on different physical platforms, and/or in which the loading of a checkpointed state vector is indirect, that is, either transmitted over a network or loaded from a storage device.

Shared Computer System Image

The embodiments of the invention involving simultaneous multi-path processing (with or without state vector loading via a transmission medium), all involve sharing an image (state vector) of the computer system between different virtual machines. As is discussed above, a single computer system image can be shared by many clients in a read-only fashion. This image is created as a checkpoint from a computer system which is configured with all of the commonly used applications in a particular computing environment. This common image may, for example, be placed on a central server, where it is accessible by client computer systems connected to the server. Each client computer system can then load this central image, and keep updates to this read-only checkpoint in local storage.

To effectively implement this in a typical environment with a diverse hardware population requires a virtual machine monitor. This is because the applications and operating systems need to be configured for the particular computer system on which they are operating. If a single computer system image is to be run on diverse hardware platforms, for example, then it would be unclear how to configure the software in the case of conventional operating systems such as Windows 95, Windows 98, or Windows NT. A virtual machine monitor solves this problem by exporting to the operating system and applications a standard set of hardware interfaces. The software is then configured for these standard hardware interfaces, and the virtual machine monitor, using techniques such as those described in U.S. patent application Ser. Nos. 09/151,175 and 09/179,137, then maps these standard interfaces to the actual hardware on the client computer system.

Sharing a single computer system image in this fashion has two main benefits. First, by sharing the single image amongst many client computer systems, an overall reduction in the storage required is achieved, thus reducing costs. Second, by running a common image on a variety of client computer systems, the maintenance and support costs are greatly reduced. This reduction in support costs is due to the reduced number of configurations that are in use. Also, when problems do arise, they are likely to be shared problems, and the solutions to these problems will be well known. Once the problem is solved, then the state vector of the "corrected" machine can be loaded into all the client systems once and for all.

The capability of sharing the entire state of a machine would also be very useful in situations—which are all too common—requiring the debugging of problems. At present, a user who is experiencing problems with an application must contact a technical support department, sometimes within the same enterprise, sometimes located far away and accessible only by telephone. The user—who is often unknowledgeable about computers—must then attempt to explain the problem to a technician, who must, based on an often sketchy explanation, guide the user through various steps in order to diagnose and, in the best case, correct the problem.

Using the invention, if the user's system (for example, the virtual machine monitor on which he is operating) is programmed or directed using known techniques to generate a checkpoint and store the state vector where the error has occurred, then the user could transmit the state vector to the system at the technical support department, where the technician would then have access to the entire state of the user's computer. Other, earlier, checkpoints (generated, for example, according to some predetermined schedule, for example, in conjunction with normally scheduled back-ups, or at predetermined time intervals) could also be transmitted to the service site. These checkpoint(s) can then be loaded into a virtual machine at the service site having the same architecture as the user's. The technician could then exactly reconstruct and view the state and behavior of the user's system at the (check)point where the error occurred, and even analyze the processing steps leading up to the error. The technician's own system could insert additional checkpoints to allow analysis of intermediate machine states. Once the technician has identified and corrected the error, the "corrected" state vector could be transmitted back for loading into the user's system. The invention thus enables "off-line" software service with almost no action required on the part of the user other than the initiation of the state vector transfers. This could be done, for example, using normal web browser techniques.

Similarly, a software designer who is having difficulties debugging a program could distribute copies of the state vectors for his program to one or more colleagues, who may be within the same enterprise or even spread around the world. Assuming each person has the same virtual machine monitor and has—or loads—an architecturally identical virtual machine, then each person could independently study the problem and transmit a solution—the corrected state vector—to the original user. This "distributed" processing from an identical initial state need not be limited to debugging applications; rather, several different users could try different processing paths to attempt to find a solution—or part of a solution—to some complicated mathematical or technical problem.

Checkpoint Updating Using Copy-on-Write

One of the problems of storing state vectors is that they can be very large. The memory requirement of software tends to grow quickly from year to year, but even now it may require as much as 1 gigabyte of memory to store the entire state of a typical computer system (real or implemented as a virtual machine). In embodiments of the invention where many checkpoints need to be stored, the need for storage could surpass the storage available for normal operation. In the extreme case, where a checkpoint is generated after every instruction, to enable step-by-step analysis of the processing path, it may be necessary to store thousands or even millions of state vectors. At even 1 gigabyte each, this would quickly exceed the storage capacity of most users' systems. Moreover, in embodiments of the invention in which one or more state vectors are transmitted over a network, transfer of such large files would take a long time. In the preferred embodiment of the invention, only one state vector—the initial vector S0—need be stored in its entirety; subsequent states are represented not as entire state vectors, but rather as vectors of state changes using copy-on-write techniques.

By way of example, assume that the initial state vector S0, that is the state of a virtual machine at a first checkpoint VM1(0), has m elements e1, e2, e3, . . . , em (which might in turn be data lists, such as entire memory blocks). Thus, S0(i)= (e1, e2, e3, . . . , em). S0(1)=e1, S0(3)=e3, and so on. Note that m will normally be on the order of millions, and often even more.

Assume a virtual machine VM1 and that, during processing from the initial checkpoint VM1(0), at which S0 was generated and stored, to the next checkpoint VM1(1), the only changes in state occurred to elements e3, e8 and e100. In the preferred embodiment of the invention, the system (in particular, the virtual machine monitor) then stores not the entire state vector 51, but rather a vector of changes dS1. This change vector will also include a pointer adr(S0) back to the previous state vector, in this case, S0. Conceptually, this change vector will have the structure dS1=(adr(S0)|0, 0, e3, 0, 0, 0, 0, e8, 0, 0, . . . , e100, 0, . . . 0) where a "0" indicates no change and a non-zero value indicates a change relative to the previously stored value. Note that this is simply a conceptual representation: the value "0" may of course itself be a changed value relative to the previous state element. In practice, each change vector may be stored as an array of indices and values, thereby reducing the often very sparse vector to a much smaller, but full, vector pair of values and address pointers. Even an actual "0" value will thus accurately be indicated as a change, since it will be indexed as such in the change array. Such techniques for storing related vectors as compressed, linked lists are well known and any conventional technique may be used.

The question then becomes how to reconstruct the state vector S1 for VM(1) based on the change vector dS1. This may be done by implementing the following procedure:

```
For i = 1 to m:
    If dS1(i) is not = 0, then set S1(i) to dS1(i);
    else: set S1(i) to S0(i)
```

(In this representation of the procedure, the address link back to the previous state change vector has been eliminated merely for the sake of clarity—the link, or some equivalent index table, is required and can be assumed in order for the system to know the order and location of the various vectors.)

Assume now that, during the next transaction, from checkpoint VM1(1) to VM1(2), state elements e1, e8, e50 and e1000 are changed. The question then becomes how to represent and construct the state vector for this next checkpoint. The change vector dS2 could thus be represented as:

$$dS2(i)=(e1, 0, 0, 0, 0, 0, 0, e8, 0, e50, 0, \ldots, 0, e1000, 0, \ldots, 0)$$

In order to reconstruct the entire state vector S2($i$) at checkpoint VM1(2), the system (virtual machine monitor) may follow a similar procedure:

```
For i = 1 to m:
    If dS2(i) is not = 0, then set S2(i) to dS2(i);
    else:
        If dS1(i) is not = 0, then set S2(i) to dS1(i);
        else: set S2(i) to S0(i)
```

In general, in order to construct the state vector SAO given a current change vector $dS_j(i)$, all previous change vectors $dS_{j-1}(i), dS_{j-2}(i), \ldots, dS_1(i)$ and the initial state vector $S_0(i)$, the following routine may be followed:

```
Let dS₀ = S0
For i = 1 to m:
    p = 0
```

-continued

```
While dS_{j-p}(i) = 0 and p < j
    p = p + 1
Endwhile
Set S_j(i) = dS_{j-p}(i)
```

Expressed in words, the values of the elements of the state vector at any given checkpoint are the most recent values. If no change has occurred since the initial state, then their initial values are the most recent, and should be included as elements of the current state vector. Otherwise, the system examines previous state vectors in order of recency and includes the value of each element that resulted from the most recent change.

Conventional techniques may be used for detecting changes in the state of virtual machines on actual systems. For example, copy-on-write techniques are well known and may be used to implement the change-tracking mechanism used to construct the state change vectors.

Storing the initial state vector S0 and only the vectors of subsequent changes consumes the least storage. Moreover, it will in general not be a significant computational burden to reconstruct the entire state vector for any checkpoint, even with a large number of linked change vectors. On the other hand, it would instead be possible to compile vectors of cumulative changes at each checkpoint, which would, from checkpoint to checkpoint, accumulate all element changes since the previous checkpoint, but not the entire initial state vector S0. In other words, each total state vector could be constructed by comparing only the current cumulative change vector with the initial state vector S0—there would be no need to "work backwards" until a non-changed element is found. This cumulative procedure would be faster, but with increasing numbers of checkpoints, the storage requirements would grow faster than for the method described above, in which only transaction-to-transaction changes need be stored. In some cases, it would also be advantageous to apply all the cumulative changes to the most recent state vector. A further option is to include the values in the initial state, as well as the cumulative changes, in the most recent vector, bypassing the need to refer to the initial state vector S0 when reconstructing the total machine state.

If the number of checkpoints is very large, yet there is a need for greater processing speed, then a combination of the two techniques—transactional change vectors and cumulative change vectors—may be used. In this case, complete state vectors may be compiled at predetermined intermediate "base" checkpoints, with transactional or cumulative change vectors being compiled at checkpoints between the intermediate checkpoints and relative to the most recent intermediate base checkpoint. For example, an intermediate base checkpoint could be set after every k'th checkpoint, where k is some experimentally or even arbitrarily selected number. Alternatively, the current memory usage could be tracked, using known techniques, and a base checkpoint could be set whenever the increase, or rate of increase, in usage exceeds some preset threshold.

Moreover, after an initial checkpoint is generated, which will contain the total state information, it is not necessary for each subsequent state vector (checkpoint) to be restricted to either total state or just state change information. Rather, a checkpoint could be partitioned into total-state and changed-state portions: For devices or other system components whose state changes relatively little over the time between two checkpoints, then each new checkpoint could contain, in the changed-state portion, only the respective state changes; for other parts of the system whose state changes much faster and more extensively, then each new checkpoint could contain, in the total-state portion, the entire collection of state information for those parts. For any checkpoint, the total state of the system could then be found by taking the total-state portion as is, and accumulating changes for the changed-state portion using the procedure described above.

Deleting Checkpoints

In some cases, it may not be necessary to store state information relating to certain checkpoints. For example, if ten checkpoints have been generated, that is, ten transactions have been completed, but no occurrence of interest to the user has happened. The first nine of these checkpoints would thus be consuming storage unnecessarily. If complete state vectors are stored at each checkpoint, then the system could simply release the storage used for the nine vectors.

The system according to the invention is also able to delete checkpoints, however, even when only change vectors are stored from transaction to transaction. Assume there are three consecutive state change vectors $dS_{j-1}(i)$, $dS_j(i)$ and $dS_{j+1}(i)$ for checkpoints (j−1), j and (j+1), respectively. Assume also that the middle state vector $dS_j(i)$ (and corresponding checkpoint j) is to be deleted in order to save storage. In this case, the middle checkpoint can be deleted by forming the most recent state change vector as the accumulation of $dS_j(i)$ and $dS_{j+1}(i)$. In other words, $dS_{j+1}(i)$ is formed as described above as a cumulative vector of changes since the checkpoint (j−1): For every element of $dS_{j+1}(i)$ that indicates a change, it is retained, otherwise, the value of $dS_j(i)$ is set for that element. Multiple intermediate checkpoints can be eliminated by following the procedure described above for accumulating state changes to create total state vectors, but in this case only the state change vectors since the most recent checkpoint to be retained need be included in the accumulation procedure. The address link of the state change vector $dS_{j+1}(i)$ would then also be changed to point to the checkpoint just before the deleted checkpoint(s).

Requests for Generating and Restoring Checkpoints

Whichever state extraction and restoration component is implemented—the preferred virtual machine monitor, a driver installed within the operating system, or some dedicated hardware component (see below)—some mechanism must be included for issuing a request for or otherwise triggering a checkpoint to be generated. Some similar mechanism must be included to signal that a particular checkpoint is to be loaded or restored into some machine (physical or virtual).

Initiating the storage of a checkpoint may be done either by user decision, or automatically, according to some schedule, or both. For example, a conventional icon or menu item or keyboard command could be included in some portion of a standard display such as a tool bar. Whenever the user selects, for example "clicks" on, the icon, a checkpoint request signal would then be passed to the virtual machine monitor, which would then immediately take or "set" a checkpoint. If multiple checkpoints are allowed, then some conventional display technique, for example, a pull-down menu, could be used to present, suitably labeled, to the user. By selecting a checkpoint, once again, for example, by clicking on a suitable icon or portion of a menu, the user would then be issuing a restoration signal, whereby the virtual machine monitor would load the selected checkpoint into the virtual machine. Similar techniques may be used to direct when, how, and to which virtual machine a checkpoint is to be transferred and loaded.

In many cases, it would be preferable for checkpoints to be generated automatically, either because a user could not do it at the right point, or fast enough, or simply because it would be more convenient. For example, assume that a checkpoint is to set after every machine instruction in a series in order to allow step-by-step debugging. A user could not possibly activate an input device fast enough, unless some other mechanism is included to generate an interrupt after each instruction. A user may also want a checkpoint only upon the occurrence of some event that is not visible, or is too fast for him to react to. In other cases, checkpoints may be scheduled, for example, before any new executable file (for example, downloaded from the Internet) is run, or before some new software is installed. Each of these events may be used to trigger a checkpoint. Known programming techniques may be used to implement these checkpoint triggers.

Several applications of the different embodiments of the invention have been described above. There are many more. Some other examples of applications of the invention will now be described.

Undo of Complex Operations

The installation of new computer software on an existing system is frequently a complex operation, involving multiple updates over a period of time. If the installation fails for any reason, then the computer system can be left in an unusable state. Even when the installation is successful, the subsequent operation of the computer system can be affected. Moreover, a computer system can be destabilized by the addition of a new software component and its subsequent operation can be error-prone.

Using the invention, however, a checkpoint of the computer system may be set before the installation is begun. The computer system can then be rolled back (the checkpoint state vector can be reloaded) to this saved state in the event of an error during installation, or if the system later proves to be unstable. Being able to checkpoint the state of the computer system, and to roll back to this state if needed, automatically provides the ability to undo complex operations like the installation of new software.

This ability can be applied to other complex operations as well, especially in cases where the user of the computer system is uncertain about the effect of executing some software. Alpha or beta versions of software are, by definition, not completely tested. A user who wishes to run such software could install it in a virtual machine according to the invention, set a checkpoint before installation and another before execution of the software, and can then run it without risk of permanently damaging other installed software or data.

Improved Safety of Operation

The operation of a computer system is subject to a variety of problems, due to errors in the software, or to environmental conditions, such as loss of power. When an event occurs that causes the operating system of the computer to crash, there is typically a loss of data. If the state of the computer system is regularly saved in checkpoints, then the state of the computer system can be restored to the most recent checkpoint before the error, minimizing the loss of data. Furthermore, the regular checkpointing can be automated using conventional programming techniques in conjunction with the virtual machine monitor, and can be transparent to the user of the computer system.

An additional improvement in the safety of operation of a computer system can be achieved through the encapsulation property of the virtual machine monitor according to the invention. If an application or operating system running in a virtual machine crashes, then that crash will not also bring down the computer, and applications and operating systems running in other virtual machines can continue to operate unaffected.

Another application of the encapsulation concept is in the case of server application based on a cluster of cooperating computer systems. This configuration is commonly used for server applications that require a high degree of availability, for example an electronic commerce server. If these cooperating computer systems are all running in a virtual machine, then the failure of any one of the systems need not affect the other systems running on the same hardware. Moreover, with regular checkpointing according to the invention, the computer system that failed can be started up from the most recent checkpoint, without having to reboot the operating system and reload the application. This increases the overall uptime and throughput of the cluster.

Instant On

The operation of restoring the computer system state from a checkpoint and starting execution from that checkpoint will in most cases be much quicker than the process of starting a computer from a powered down state, booting the operating system, and launching the appropriate applications. A checkpoint could therefore be made just after the system has booted fully. If this post-boot checkpoint is then exported and loaded into one or more other computers, then each such computer will not need to go through the full boot-up procedure at all, but rather will start at the post-boot checkpoint.

This "instant on" feature is also useful in demonstrations, where the time to show an application's features is limited. A checkpoint in these cases can be created with the application in a state where the demonstration is about to begin. Then the demonstration can be started up immediately, after the quick restoration of the checkpoint.

Mobile Computer System

The same checkpoint can be restored on any computer system capable of running the virtual machine monitor. As FIG. 6 illustrates, all that is needed is some transmission medium that allows at least one state vector to be passed from one system to another. This yields a new kind of computer system mobility. Today, a file can be easily shared between computer systems, for example by placing the file on a web page that is accessible from the other computer. This allows the data in the file to be shared between the two computer systems.

Alternatively, the checkpoint may be transmitted directly between two computer systems without involving any intermediate storage medium. Instead of storing the checkpoint into some storage medium, the state vector may be transmitted directly over a transmission medium to a remote computer system that receives and restores the state vector into another virtual machine.

If a checkpoint is similarly shared, then the entire computer system image, including all of the files and applications, can be shared between the two computer systems. As is mentioned above, this might be useful in debugging problems—even remotely—with one of the computer systems, or to transmit a presentation or demonstration to a remote location, where the presentation involves a number of files and applications.

One other application of this capability is that a user of one computer system—a "home" computer—could store a checkpoint on a portable medium, or could make it accessible (perhaps with password protection or in encrypted form) via a network, for example, as a web page, or as a large e-mail attachment. If the user then travels to another site, as long as he is able to access a remote computer that also includes the invention, and that has a virtual machine with the same architecture as the "home" computer, then the user can import the checkpoint into the remote computer and continue working from exactly the same point as if he had not left the home computer at all. If the checkpoint is stored on a portable storage medium such as a high-capacity removable hard disk or on a recordable CD disk, then the user's computer configuration and complete state would be contained on the medium and can be carried from site to site. In essence, the invention thus allows the user to create a "computer on a disk."

Virus Protection

This invention be used to make a particular computer system virus-proof. Assume that the user(s) of the computer operates only in virtual space, that is, all applications are run in a virtual machine (not necessarily the same one). If a checkpoint is taken before any communication with any device not part of the system itself (for example, reading a floppy disk or downloading data such as files or e-mail, via a network) then all such data will be located in storage allocated to the particular virtual machine. Because the entire virtual machine is encapsulated—including the virtual memory, in which any virus would reside—then once the user notices the effects of a virus, the user can restore the checkpoint and proceed from the earlier restored state as if the virus had never entered the (virtual) system at all.

Encapsulation—Inside Vs. Outside the System

In the description of the embodiments of the invention above, especially the preferred embodiment that includes the virtual machine monitor, frequent reference is made to the "system." The system encompasses three main components—the hardware (including, for example, the processor, motherboard circuitry, memory devices, peripherals, etc.), system software (such as the operating system and, in most cases, the BIOS), and applications. These are of course the components that make up most computers. In the context of the preferred embodiment of the invention, however, all of these components (the "system") are virtual, that is, part of a virtual machine. Extracting the state of any given virtual machine, however, is handled by the virtual machine monitor, which is completely outside of and invisible to any of the virtual machines. The preferred embodiment of the invention therefore requires no modification of any kind to any part of any virtual system and no cooperation from, or synchronization with, any application running on any virtual machine. The state of each virtual machine is therefore completely encapsulated, since it resides entirely in storage that is accessible to the virtual machine monitor.

It would also be possible to implement the state-extraction mechanism as a dedicated hardware component, similar to existing components that are used to extract information from processor registers. For use in the invention, the component would then also interrupt the processor long enough to read and store (or transmit) not only the register state, but also the state of applications, devices, and system software, as needed. The design, construction and implementation of such a component lies within the skill of those knowledgeable in the art of digital hardware design.

We claim:

1. A method comprising:
generating a state vector representing a total machine state for a virtual machine;
establishing the state vector for the virtual machine as a read-only common computer system image for use by multiple users;
loading the state vector into a plurality of virtual machines; and
enabling processing paths of a first and second virtual machine of the plurality of virtual machines to diverge.

2. The method of claim 1, wherein the common computer system image is stored on a server computer, and wherein a first user of the multiple users accesses the common computer system image on the server computer from a first client computer and a second user of the multiple users accesses the common computer system image on the server computer from a second client computer.

3. The method of claim 2, further comprising:
enabling the first user to use the first virtual machine and enabling the second user to use the second virtual machine; and
enabling the first and second users to enter different data in the first and second virtual machines, respectively, so that the processing paths of the first and second virtual machines diverge.

4. The method of claim 2, wherein updates to the common computer system image are kept in local storage on client computers.

5. The method of claim 2 further comprising:
generating a checkpoint of the first virtual machine;
transferring the checkpoint of the first virtual machine to the first client computer;
restoring the checkpoint of the first virtual machine in a first remote virtual machine in the first client computer; and
enabling the first user to use the first remote virtual machine in the first client computer.

6. The method of claim 5 further comprising:
generating a checkpoint of the second virtual machine;
transferring the checkpoint of the second virtual machine to the second client computer;
restoring the checkpoint of the second virtual machine in a second remote virtual machine in the second client computer; and
enabling the second user to use the second remote virtual machine in the second client computer.

7. The method of claim 6, wherein the checkpoint of the first virtual machine is transferred to the first client computer and the checkpoint of the second virtual machine is transferred to the second client computer using a network.

8. A system comprising:
a first virtual machine;
a second virtual machine; and
a processor programmed to:
generate a state vector representing a total machine state for the first virtual machine;
establish the state vector for the first virtual machine as a read-only common computer system image for use by multiple users;
load the state vector into the first virtual machine and the second virtual machine; and
enable processing paths of the first virtual machine and the second virtual machine to diverge.

9. The system of claim 8, further comprising a server computer, wherein the common computer system image is stored on the server computer, and wherein a first user of the multiple users accesses the common computer system image on the server computer from a first client computer and a second user of the multiple users accesses the common computer system image on the server computer from a second client computer.

10. The system of claim 9, wherein the processor is further programmed to:
enable the first user to use the first virtual machine and enable the second user to use the second virtual machine; and
enable the first and second users to enter different data in the first and second virtual machines, respectively, so that the processing paths of the first and second virtual machines diverge.

11. The system of claim 9, wherein updates to the common computer system image are kept in local storage on client computers.

12. The system of claim 9, wherein the processor is further programmed to:
generate a checkpoint of the first virtual machine;
transfer the checkpoint of the first virtual machine to the first client computer;
restore the checkpoint of the first virtual machine in a first remote virtual machine in the first client computer; and
enable the first user to use the first remote virtual machine in the first client computer.

13. The system of claim 12 wherein the processor is further programmed to:
generate a checkpoint of the second virtual machine;
transfer the checkpoint of the second virtual machine to the second client computer;
restore the checkpoint of the second virtual machine in a second remote virtual machine in the second client computer; and
enable the second user to use the second remote virtual machine in the second client computer.

14. The system of claim 13, further comprising a network, and wherein the processor is further programmed to:
transfer, over the network, the checkpoint of the first virtual machine to the first client computer; and
transfer, over the network, the checkpoint of the second virtual machine to the second client computer.

15. One or more non-transitory computer-readable media comprising computer-executable instructions that, when executed by one or more processors, cause the one or more processors to:
generate a state vector representing a total machine state for a virtual machine;
establish the state vector for the virtual machine as a read-only common computer system image for use by multiple users;
load the state vector into a plurality of virtual machines; and
enable processing paths of a first and second virtual machine of the plurality of virtual machines to diverge.

16. The one or more non-transitory computer-readable media of claim 15, wherein the common computer system image is stored on a server computer, and wherein the computer-executable instructions further cause the one or more processors to:
enable a first user of the multiple users to access the common computer system image on the server computer from a first client computer; and
enable a second user of the multiple users accesses the common computer system image on the server computer from a second client computer.

17. The one or more non-transitory computer-readable media of claim 16, wherein the computer-executable instructions further cause the one or more processors to:
enable the first user to use the first virtual machine and enable the second user to use the second virtual machine; and
enable the first and second users to enter different data in the first and second virtual machines, respectively, so that the processing paths of the first and second virtual machines diverge.

18. The one or more non-transitory computer-readable media of claim 16, wherein updates to the common computer system image are kept in local storage on client computers.

19. The one or more non-transitory computer-readable media of claim 16, wherein the computer-executable instructions further cause the one or more processors to:
generate a checkpoint of the first virtual machine;
transfer the checkpoint of the first virtual machine to the first client computer;
restore the checkpoint of the first virtual machine in a first remote virtual machine in the first client computer;
enable the first user to use the first remote virtual machine in the first client computer;
generate a checkpoint of the second virtual machine;
transfer the checkpoint of the second virtual machine to the second client computer;
restore the checkpoint of the second virtual machine in a second remote virtual machine in the second client computer; and
enable the second user to use the second remote virtual machine in the second client computer.

20. The one or more non-transitory computer-readable media of claim 19, wherein the computer-executable instructions further cause the one or more processors to:
transfer the checkpoint of the first virtual machine to the first client computer; and
transfer the checkpoint of the second virtual machine to the second client computer.

* * * * *